(12) United States Patent
Atur et al.

(10) Patent No.: US 11,528,186 B2
(45) Date of Patent: Dec. 13, 2022

(54) AUTOMATED INITIALIZATION OF BARE METAL SERVERS

(71) Applicant: Robin Systems, Inc., San Jose, CA (US)

(72) Inventors: Sree Nandan Atur, Newark, CA (US); Kapil Upadhayay, Bangalore (IN); Ravi Kumar Alluboyina, Santa Clara, CA (US); Lakshay Badlani, Hayward, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/903,266

(22) Filed: Jun. 16, 2020

(65) Prior Publication Data

US 2021/0392039 A1 Dec. 16, 2021

(51) Int. Cl.
| | |
|---|---|
| H04L 41/0806 | (2022.01) |
| H04L 61/5007 | (2022.01) |
| H04L 67/00 | (2022.01) |
| G06F 8/61 | (2018.01) |
| G06F 8/65 | (2018.01) |
| G06F 9/4401 | (2018.01) |

(52) U.S. Cl.
CPC ............ *H04L 41/0806* (2013.01); *G06F 8/61* (2013.01); *G06F 8/65* (2013.01); *G06F 9/4406* (2013.01); *H04L 61/5007* (2022.05); *H04L 67/34* (2013.01)

(58) Field of Classification Search
CPC ....... H04L 41/0806; H04L 67/34; G06F 8/61; G06F 8/65

USPC .......................................................... 709/222
See application file for complete search history.

(56) References Cited

U.S. PATENT DOCUMENTS

| | | |
|---|---|---|
| 3,715,573 A | 2/1973 | Vogelsberg |
| 4,310,883 A | 1/1982 | Clifton |
| | (Continued) | |

FOREIGN PATENT DOCUMENTS

WO WO2017008675 1/2017

OTHER PUBLICATIONS

Segment map, GOOGLE, Feb. 4, 2019.
(Continued)

*Primary Examiner* — Tauqir Hussain
(74) *Attorney, Agent, or Firm* — David R. Stevens; Stevens Law Group

(57) ABSTRACT

A bare metal server, or other computing device, may be represented as a JSON file (extending the concept to infrastructure as code) containing hardware, firmware and software versions with links to a kickstarter file depending on the needs of an application, SKU type or some other criteria. Rather than a management node in an L2 network which has a DHCP server to IP lease and facilitate OS installation, a workflow then generates a bootstrap kernel which initializes the bare metal server with an IP address, VLAN, and network gateway which is used to reach out to the network to download and install a kernel, upgrade firmware for various hardware components like BIOS, BMC, NIC, RAID, SSD, NVME, FPGA, etc. The bootstrap kernel may further configure RAID and JBOD, flash custom images on hardware components and may further instruct the server to incrementally download and install an operating system.

23 Claims, 16 Drawing Sheets

(56) References Cited

U.S. PATENT DOCUMENTS

| | | |
|---|---|---|
| 5,602,993 A | 2/1997 | Stromberg |
| 5,680,513 A | 10/1997 | Hyland |
| 5,796,290 A | 8/1998 | Takahashi |
| 6,014,669 A | 1/2000 | Slaughter |
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,386,752 B1 | 6/2008 | Rakic |
| 7,461,374 B1 | 12/2008 | Balint |
| 7,467,268 B2 | 12/2008 | Lindemann |
| 7,535,854 B2* | 5/2009 | Luo .............. H04L 41/0806 370/254 |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1* | 10/2011 | Schloss .......... H04L 41/0809 713/2 |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,589,447 B1 | 11/2013 | Grunwald |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,009,542 B1 | 4/2015 | Marr |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,590,872 B1 | 3/2017 | Jagtap |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,733,992 B1 | 8/2017 | Poeluev |
| 9,747,096 B2 | 8/2017 | Searle |
| 9,870,366 B1 | 1/2018 | Duan |
| 9,880,933 B1 | 1/2018 | Gupta |
| 9,892,265 B1 | 2/2018 | Tripathy |
| 9,898,471 B1 | 2/2018 | Liu |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,133,619 B1 | 11/2018 | Nagpal |
| 10,169,169 B1 | 1/2019 | Shaikh |
| 10,191,778 B1 | 1/2019 | Yang |
| 10,241,774 B2 | 3/2019 | Spivak |
| 10,282,229 B2 | 5/2019 | Wagner |
| 10,339,112 B1 | 7/2019 | Ranade |
| 10,346,001 B2 | 7/2019 | Greenberg |
| 10,353,634 B1 | 7/2019 | Greenwood |
| 10,430,434 B2 | 10/2019 | Sun |
| 10,496,653 B1 | 12/2019 | Epshteyn |
| 10,564,850 B1 | 2/2020 | Gud |
| 10,657,119 B1 | 5/2020 | Acheson |
| 10,705,878 B2 | 7/2020 | Liu |
| 10,956,246 B1 | 3/2021 | Bagde |
| 11,082,333 B1 | 8/2021 | Lam |
| 2002/0141390 A1* | 10/2002 | Fangman .......... H04L 65/1043 370/352 |
| 2003/0126426 A1* | 7/2003 | Frye, Jr. ............ G06F 9/4416 713/2 |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1* | 1/2007 | Waltermann ....... G11B 20/1217 713/176 |
| 2007/0033356 A1 | 2/2007 | Erlikhman |
| 2007/0067583 A1 | 3/2007 | Zohar |
| 2007/0165625 A1* | 7/2007 | Eisner ............... G06Q 20/223 370/389 |
| 2007/0169113 A1 | 7/2007 | Moore |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0083012 A1 | 4/2008 | Yu |
| 2008/0189468 A1 | 8/2008 | Schmidt |
| 2008/0235544 A1 | 9/2008 | Lai |
| 2008/0256141 A1 | 10/2008 | Wayda |
| 2008/0256143 A1 | 10/2008 | Reddy |
| 2008/0256167 A1 | 10/2008 | Branson |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |

(56) References Cited

U.S. PATENT DOCUMENTS

| | | | |
|---|---|---|---|
| 2010/0211815 A1 | 8/2010 | Mankovskii | |
| 2010/0274984 A1 | 10/2010 | Inomata | |
| 2010/0299309 A1 | 11/2010 | Maki | |
| 2010/0306495 A1 | 12/2010 | Kumano | |
| 2010/0332730 A1 | 12/2010 | Royer | |
| 2011/0083126 A1 | 4/2011 | Bhakta | |
| 2011/0119664 A1* | 5/2011 | Kimura | G06F 8/60 717/173 |
| 2011/0161291 A1 | 6/2011 | Taleck | |
| 2011/0188506 A1 | 8/2011 | Arribas | |
| 2011/0208928 A1 | 8/2011 | Chandra | |
| 2011/0239227 A1 | 9/2011 | Schaefer | |
| 2011/0246420 A1 | 10/2011 | Wang | |
| 2011/0276951 A1 | 11/2011 | Jain | |
| 2012/0005557 A1 | 1/2012 | Mardiks | |
| 2012/0016845 A1 | 1/2012 | Bates | |
| 2012/0066449 A1 | 3/2012 | Colgrove | |
| 2012/0102369 A1 | 4/2012 | Hiltunen | |
| 2012/0137059 A1 | 5/2012 | Yang | |
| 2012/0159519 A1 | 6/2012 | Matsuda | |
| 2012/0216052 A1 | 8/2012 | Dunn | |
| 2012/0226667 A1 | 9/2012 | Volvovski | |
| 2012/0240012 A1 | 9/2012 | Weathers | |
| 2012/0259819 A1 | 10/2012 | Patwardhan | |
| 2012/0265976 A1 | 10/2012 | Spiers | |
| 2012/0303348 A1 | 11/2012 | Lu | |
| 2012/0311671 A1 | 12/2012 | Wood | |
| 2012/0331113 A1 | 12/2012 | Jain | |
| 2013/0054552 A1 | 2/2013 | Hawkins | |
| 2013/0054932 A1 | 2/2013 | Acharya | |
| 2013/0080723 A1 | 3/2013 | Sawa | |
| 2013/0179208 A1 | 7/2013 | Chung | |
| 2013/0254521 A1* | 9/2013 | Bealkowski | G06F 9/4416 713/2 |
| 2013/0282662 A1 | 10/2013 | Kumarasamy | |
| 2013/0332688 A1 | 12/2013 | Corbett | |
| 2013/0339659 A1 | 12/2013 | Bybell | |
| 2013/0346618 A1* | 12/2013 | Holkkola | H04L 47/70 709/226 |
| 2013/0346709 A1 | 12/2013 | Wang | |
| 2014/0006465 A1 | 1/2014 | Davis | |
| 2014/0047263 A1 | 2/2014 | Coatney | |
| 2014/0047341 A1 | 2/2014 | Breternitz | |
| 2014/0047342 A1 | 2/2014 | Breternitz | |
| 2014/0058871 A1 | 2/2014 | Marr | |
| 2014/0059527 A1 | 2/2014 | Gagliardi | |
| 2014/0059528 A1 | 2/2014 | Gagliardi | |
| 2014/0089265 A1 | 3/2014 | Talagala | |
| 2014/0108483 A1 | 4/2014 | Tarta | |
| 2014/0130040 A1 | 5/2014 | Lemanski | |
| 2014/0149696 A1 | 5/2014 | Frenkel | |
| 2014/0181676 A1 | 6/2014 | Samborskyy | |
| 2014/0195847 A1 | 7/2014 | Webman | |
| 2014/0245319 A1 | 8/2014 | Fellows | |
| 2014/0281449 A1* | 9/2014 | Christopher | G06F 9/4403 713/2 |
| 2014/0282596 A1 | 9/2014 | Bourbonnais | |
| 2015/0007171 A1* | 1/2015 | Blake | G06F 9/45537 718/1 |
| 2015/0019495 A1 | 1/2015 | Siden | |
| 2015/0046644 A1 | 2/2015 | Karp | |
| 2015/0067031 A1 | 3/2015 | Acharya | |
| 2015/0074358 A1 | 3/2015 | Flinsbaugh | |
| 2015/0106549 A1 | 4/2015 | Brown | |
| 2015/0112951 A1 | 4/2015 | Narayanamurthy et al. | |
| 2015/0134857 A1 | 5/2015 | Hahn | |
| 2015/0149605 A1 | 5/2015 | De La Iglesia | |
| 2015/0186217 A1 | 7/2015 | Eslami | |
| 2015/0278333 A1 | 10/2015 | Hirose | |
| 2015/0317169 A1* | 11/2015 | Sinha | G06F 9/4416 713/2 |
| 2015/0317212 A1 | 11/2015 | Lee | |
| 2015/0319160 A1* | 11/2015 | Ferguson | G06F 21/6281 726/10 |
| 2015/0326481 A1 | 11/2015 | Rector | |
| 2015/0379287 A1 | 12/2015 | Mathur | |
| 2016/0011816 A1 | 1/2016 | Aizman | |
| 2016/0026667 A1 | 1/2016 | Mukherjee | |
| 2016/0042005 A1 | 2/2016 | Liu | |
| 2016/0124775 A1 | 5/2016 | Ashtiani | |
| 2016/0191308 A1* | 6/2016 | Berry | H04L 41/0886 709/221 |
| 2016/0197995 A1 | 7/2016 | Lu | |
| 2016/0239412 A1 | 8/2016 | Wada | |
| 2016/0259597 A1 | 9/2016 | Worley | |
| 2016/0283261 A1 | 9/2016 | Nakatsu | |
| 2016/0357456 A1 | 12/2016 | Iwasaki | |
| 2016/0357548 A1 | 12/2016 | Stanton | |
| 2016/0373327 A1 | 12/2016 | Degioanni | |
| 2017/0034023 A1 | 2/2017 | Nickolov | |
| 2017/0060710 A1 | 3/2017 | Ramani | |
| 2017/0060975 A1 | 3/2017 | Akyureklier | |
| 2017/0075749 A1 | 3/2017 | Ambichl | |
| 2017/0139645 A1 | 5/2017 | Byun | |
| 2017/0149843 A1 | 5/2017 | Amulothu | |
| 2017/0168903 A1 | 6/2017 | Dornemann | |
| 2017/0192889 A1 | 7/2017 | Sato | |
| 2017/0201419 A1* | 7/2017 | Garcia | H04L 41/344 |
| 2017/0206017 A1 | 7/2017 | Sun | |
| 2017/0214550 A1 | 7/2017 | Kumar | |
| 2017/0235649 A1 | 8/2017 | Shah | |
| 2017/0242617 A1 | 8/2017 | Walsh | |
| 2017/0242719 A1 | 8/2017 | Tsirkin | |
| 2017/0244557 A1 | 8/2017 | Riel | |
| 2017/0244787 A1 | 8/2017 | Rangasamy | |
| 2017/0293450 A1 | 10/2017 | Battaje | |
| 2017/0322954 A1 | 11/2017 | Horowitz | |
| 2017/0337492 A1 | 11/2017 | Chen | |
| 2017/0344354 A1* | 11/2017 | Schiefelbein | G06F 8/61 |
| 2017/0371551 A1 | 12/2017 | Sachdev | |
| 2018/0006896 A1 | 1/2018 | MacNamara | |
| 2018/0024889 A1 | 1/2018 | Verma | |
| 2018/0046553 A1 | 2/2018 | Okamoto | |
| 2018/0082053 A1 | 3/2018 | Brown | |
| 2018/0107419 A1 | 4/2018 | Sachdev | |
| 2018/0113625 A1 | 4/2018 | Sancheti | |
| 2018/0113770 A1 | 4/2018 | Hasanov | |
| 2018/0136931 A1 | 5/2018 | Hendrich | |
| 2018/0137306 A1 | 5/2018 | Brady | |
| 2018/0150306 A1* | 5/2018 | Govindaraju | G06F 9/4406 |
| 2018/0159745 A1 | 6/2018 | Byers | |
| 2018/0165170 A1 | 6/2018 | Hegdal | |
| 2018/0218000 A1 | 8/2018 | Setty | |
| 2018/0225140 A1 | 8/2018 | Titus | |
| 2018/0225216 A1 | 8/2018 | Filippo | |
| 2018/0246670 A1 | 8/2018 | Baptist | |
| 2018/0246745 A1 | 8/2018 | Aronovich | |
| 2018/0247064 A1 | 8/2018 | Aronovich | |
| 2018/0267820 A1 | 9/2018 | Jang | |
| 2018/0276215 A1 | 9/2018 | Chiba | |
| 2018/0285164 A1 | 10/2018 | Hu | |
| 2018/0285223 A1 | 10/2018 | McBride | |
| 2018/0285353 A1 | 10/2018 | Ramohalli | |
| 2018/0287883 A1 | 10/2018 | Joshi | |
| 2018/0288129 A1 | 10/2018 | Joshi | |
| 2018/0300653 A1 | 10/2018 | Srinivasan | |
| 2018/0302335 A1 | 10/2018 | Gao | |
| 2018/0329981 A1 | 11/2018 | Gupte | |
| 2018/0364917 A1 | 12/2018 | Ki | |
| 2018/0365092 A1 | 12/2018 | Linetskiy | |
| 2018/0375728 A1 | 12/2018 | Gangil | |
| 2019/0004704 A1 | 1/2019 | Rathi | |
| 2019/0065061 A1 | 2/2019 | Kim | |
| 2019/0065323 A1 | 2/2019 | Dhamdhere | |
| 2019/0073132 A1 | 3/2019 | Zhou | |
| 2019/0073372 A1 | 3/2019 | Venkatesan | |
| 2019/0079928 A1 | 3/2019 | Kumar | |
| 2019/0089651 A1 | 3/2019 | Pignatari | |
| 2019/0102226 A1 | 4/2019 | Caldato | |
| 2019/0109756 A1 | 4/2019 | Abu Lebdeh | |
| 2019/0116690 A1* | 4/2019 | Chen | G06F 11/2289 |
| 2019/0132203 A1 | 5/2019 | Wince | |
| 2019/0148932 A1 | 5/2019 | Benesch | |

(56) References Cited

U.S. PATENT DOCUMENTS

| | | | |
|---|---|---|---|
| 2019/0156023 A1 | 5/2019 | Gerebe | |
| 2019/0163460 A1 | 5/2019 | Kludy | |
| 2019/0188094 A1 | 6/2019 | Ramamoorthi | |
| 2019/0190803 A1 | 6/2019 | Joshi | |
| 2019/0199601 A1 | 6/2019 | Lynar | |
| 2019/0213080 A1 | 7/2019 | Alluboyina | |
| 2019/0213085 A1 | 7/2019 | Alluboyina | |
| 2019/0215313 A1 | 7/2019 | Doshi | |
| 2019/0220266 A1 | 7/2019 | Doshi | |
| 2019/0220315 A1 | 7/2019 | Vallala | |
| 2019/0235895 A1 | 8/2019 | Ovesea | |
| 2019/0250849 A1 | 8/2019 | Compton | |
| 2019/0272205 A1 | 9/2019 | Jiang | |
| 2019/0278624 A1 | 9/2019 | Bade | |
| 2019/0324666 A1 | 10/2019 | Kusters | |
| 2019/0334727 A1 | 10/2019 | Kaufman | |
| 2019/0335551 A1* | 10/2019 | Williams | H05B 45/24 |
| 2019/0361748 A1 | 11/2019 | Walters | |
| 2019/0369273 A1 | 12/2019 | Liu | |
| 2019/0370018 A1 | 12/2019 | Kirkpatrick | |
| 2020/0019414 A1 | 1/2020 | Byard | |
| 2020/0026635 A1 | 1/2020 | Gaber | |
| 2020/0034193 A1 | 1/2020 | Jayaram | |
| 2020/0034254 A1 | 1/2020 | Natanzon | |
| 2020/0065406 A1 | 2/2020 | Ippatapu | |
| 2020/0073586 A1 | 3/2020 | Kurata | |
| 2020/0083909 A1 | 3/2020 | Kusters | |
| 2020/0150977 A1* | 5/2020 | Wang | H04L 67/06 |
| 2020/0162330 A1 | 5/2020 | Vadapalli | |
| 2020/0257519 A1* | 8/2020 | Shen | G06F 8/65 |
| 2020/0310774 A1* | 10/2020 | Zhu | G06F 9/4401 |
| 2020/0310915 A1 | 10/2020 | Alluboyina | |
| 2020/0344326 A1* | 10/2020 | Ghosh | G06F 9/45558 |
| 2020/0356537 A1 | 11/2020 | Sun | |
| 2020/0412625 A1 | 12/2020 | Bagarolo | |
| 2021/0011775 A1 | 1/2021 | Baxter | |
| 2021/0029000 A1 | 1/2021 | Mordani | |
| 2021/0042151 A1 | 2/2021 | Muller | |
| 2021/0064536 A1 | 3/2021 | Palmer | |
| 2021/0067607 A1 | 3/2021 | Gardner | |
| 2021/0126839 A1 | 4/2021 | Rudrachar | |
| 2021/0141655 A1 | 5/2021 | Gamage | |
| 2021/0157622 A1 | 5/2021 | Ananthapur | |
| 2021/0168034 A1 | 6/2021 | Qian | |
| 2021/0271506 A1* | 9/2021 | Ganguly | H04L 67/34 |
| 2021/0406079 A1* | 12/2021 | Atur | G06F 9/4881 |
| 2022/0107842 A1 | 4/2022 | Jiang | |

OTHER PUBLICATIONS

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al., "The Container Manager Pattern", ACM, pp. 1-9 (Year 2017).

Rehmann et al., "Performance of Containerized Database Management Systems", ACM, pp. 1-6 (Year 2018).

Awada et al.,"Improving Resource Efficiency of Container-instance Clusters on Clouds", IEEE, pp. 929-934 (Year 2017).

Stankovski et al., "Implementing Time-Critical Functionalities with a Distributed Adaptive Container Architecture", ACM, pp. 1-5 (Year 2016).

Dhakate et al., "Distributed Cloud Monitoring Using Docker as Next Generation Container Virtualization Technology" IEEE, pp. 1-5 (Year 2015).

Crameri et al., "Staged Deployment in Mirage, an Integrated Software Upgrade Testing and Distribution System", ACM, pp. 221-236 (Year: 2007).

Cosmo et al., "Packages Upgrades in FOSS Distributions: Details and Challenges", ACM pp. 1-5 (Year: 2008).

Burg et al., "Atomic Upgrading of Distributed Systems", ACM, pp. 1-5 (Year: 2008).

Souer et al., "Component Based Architecture for Web Content Management: Runtime Deployable Web Manager Component Bundles", IEEE, pp. 366-369 (Year: 2008).

Weingartner et al., "A distributed autonomic management framework for cloud computing orchestration." In 2016 IEEE World Congress on Services (Year: 2016).

* cited by examiner

AUTOMATED INITIALIZATION OF BARE METAL SERVERS

RELATED APPLICATIONS

This application is related to U.S. application Ser. No. 16/888,600 filed May 29, 2020, U.S. application Ser. No. 16/896,094 filed Jun. 8, 2020, U.S. application Ser. No. 16/915,878 filed Jun. 29, 2020, U.S. application Ser. No. 17/061,500 filed Oct. 1, 2020, and U.S. application Ser. No. 17/089,579 filed Nov. 4, 2020, which are incorporated herein by reference for all purposes.

BACKGROUND

Field of the Invention

This invention relates to automating the initialization of network devices, such as servers.

Background of the Invention

In order to deliver a network service to a consumer, such as on a mobile device of a consumer, there are many applications, networking configurations, and other actions that are required to implement the network service, access the data managed by the network service, and to interact with a client application that interacts with the user. In many instances, these actions must be performed at many different data centers that are distributed geographically.

It would be an advancement in the art to facilitate the development and deployment of network services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
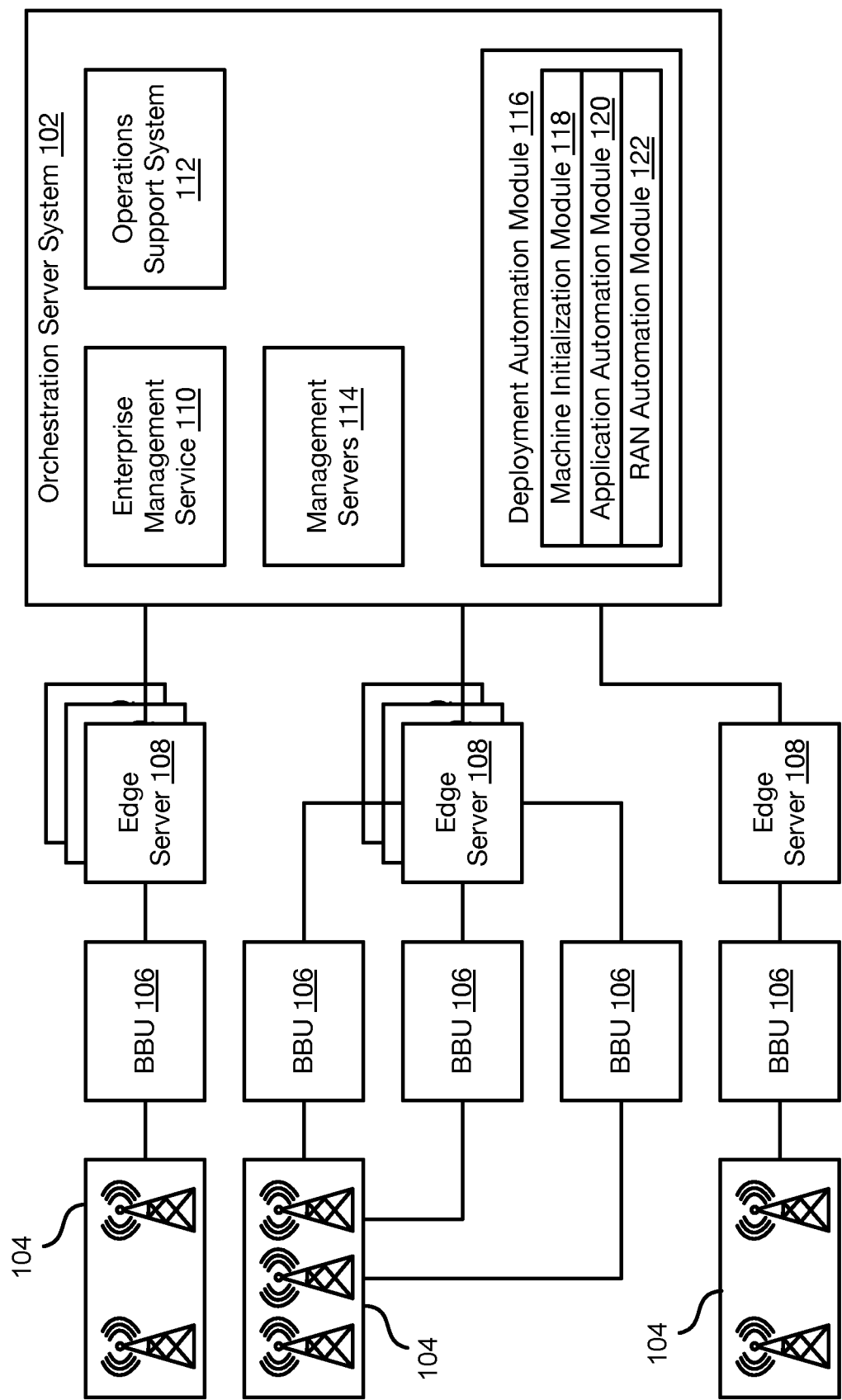
FIG. 1 is a schematic block diagram of a components of a network service and an orchestration server system in accordance with an embodiment of the present invention.

FIG. 1 illustrates an example network environment 100 in which the systems and methods disclosed herein may be used. In particular, an orchestration server system 102 may execute on one or more server computers and implement the systems and methods disclosed herein in order to implement a network service by way of one or more radio antennas 104, such antennas 104 may be configured to communicated wireless signals according to a cellular wireless data protocol (e.g., 4G, 5G, etc.) for implementing a network service to mobile devices of users.

The radio antennas 104 may be coupled to baseband units (BBU) 106 that provides translation between radio frequency signals output and received by the antennas 104 and digital data transmitted and received by edge servers 108 coupled to the antennas 104. For example, each BBU 106 may perform this translation according to any of the cellular wireless data protocols mentioned above. The edge servers 108 may be coupled to the orchestration server system 102 either directly or by way of one or more intermediary servers.

The orchestration server system 102 may implement centralized management services used to manage the edge servers 108 and BBUs 106. For example, these may include enterprise management services 110, operations support systems (OSS) 112, and one or more management servers 114 for services implemented on the edge servers 108.

The orchestration server system 102 may implement a deployment automation module 116 that facilitates deployment of the BBUs 106, edge servers 108, services executing on the BBUs 106 and edge servers 108, and centralized management services implemented by the orchestration server system 102 or other server system 102.

For example, this may include a machine initialization module 118 that detects hardware such as the computing devices implementing BBUs 106 or edge servers 108 and initializes them to receive installation of services. For example, given a computing device configured with an IP address, the machine initialization module 118 may initialize the BIOS (basic input output system), install an operating system, configure the operating system to connect to a network and to the orchestration server system 102, and install an agent for facilitating installation of services and for performing management functions on the computing device at the instruction of the deployment automation module 116. For example, the machine initialization module 118 may use COBBLER in order to initialize the computing device.

The machine initialization module 118 may also discover computing devices on a network and generate a topology of the devices, such as in the form of a directed acyclic graph (DAG). The deployment automation module 116 may then use this DAG to select computing devices for implementing network services and in order to configure a machine to receive installation of a network service.

The deployment automation module 116 may include an application automation module 120 that automates the deployment of an application, such as a container executing an application, on a computing device. The application automation module 120 may implement methods and systems described below relating to the automated deployment and management of applications.

One example application of the systems and methods disclosed herein is a radio area network (RAN) automation module 122 that performs the automated deployment of a network service in the illustrated network environment, including instantiating, configuring, and managing services executing on the BBUs 106, edge servers 108, and orchestration server system 102 in order to implement a RAN in a one-click automated fashion.

Figure 2:
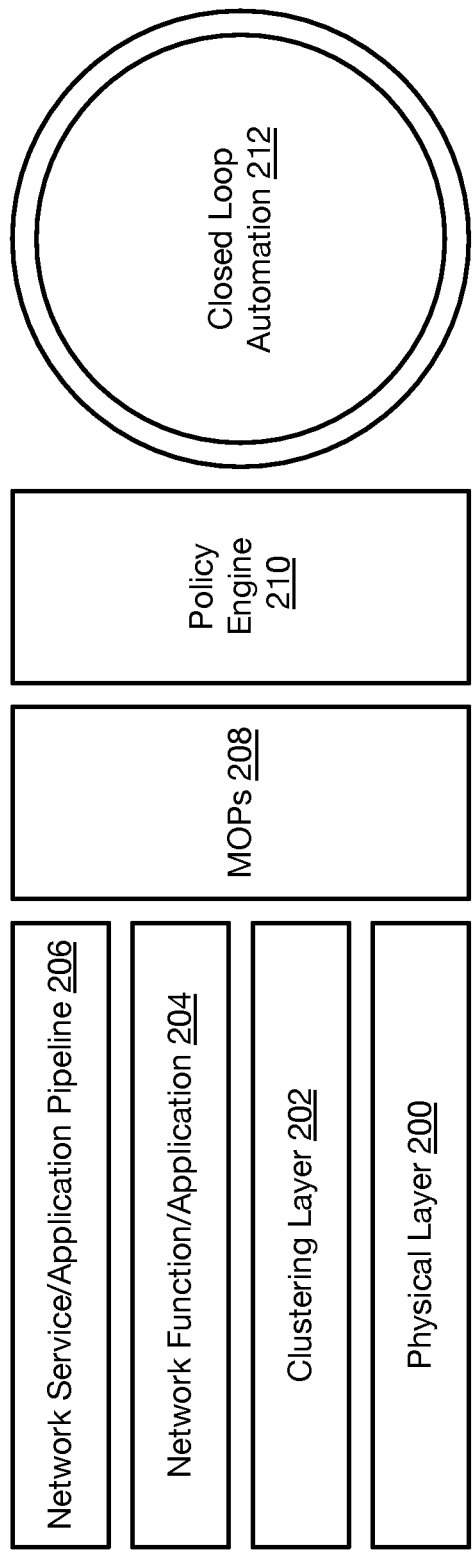
FIG. 2 is a schematic block diagram of layers and external management functions of a network service in accordance with an embodiment of the present invention.

FIG. 2 is a schematic block diagram of layers and external management functions of a network service in accordance with an embodiment of the present invention. At the base, is a physical layer 200 including hardware of a computing device. The physical layer 200 may also include basic software such as BIOS, firmware, operating system, or even a virtual machine executing on the computing device.

A clustering layer 202 resides on the physical layer 200 and includes data structures and software that enables a group of computing devices to act as a cluster. A cluster may be defined as a group of devices that are backups of one another, that provide a service with requests for that service being distributed among devices of the cluster according to a load balancing approach, that together implement a plurality of distinct applications that cooperate with one another to implement a service, or that are associated to one another for a common purpose or according to an arbitrary cluster definition of an administrator. The clustering layer 202 may be implemented by agent software executing on the physical layer 200 that coordinates with the deployment automation module 116 and other devices of a cluster to implement a cluster.

The network function/application layer 204 includes applications executing on the computing devices of a cluster that individually or together with other applications executing on other nodes of the cluster implement a network service, such as access to a database, web server, or other server-based computational function that may be provided as a service to a user or another service of a network environment 100.

A network service/application pipeline layer 206 may include a pipeline of network functions/applications 204 that communicate with one another to implement a more complex network service.

Operations of any of the layers 200-206 may be managed by method and procedures (MOPs) 208 that are independent of the services implemented by the layers and include management functions such as instantiating, upgrading, health checks, monitoring power, restarting, replacing, scaling, and shutting down of the entities implementing a layer 200-26 (also referred to as life cycle management (LCM)).

A policy engine 210 may likewise operate with respect to any of the layers 200-206 and provide logic defining actions performed with respect to some or all of the layers 200-206, such as procedures for implementing backups, handling faults at a particular layer, prioritization of individual MOPs 208, or other policies that an administrator may wish to impose on the operation of any of the layers 200-206.

For example, the policy engine 210 may have access to a topology of an application pipeline created according to the methods disclosed herein. Error messages received from elements of the pipeline may be received and aggregated in chronological order, such as using the approach described in U.S. application Ser. No. 16/561,994 filed Sep. 5, 2019, and entitled Performing Root Cause Analysis in a Multi-Role Application, which is hereby incorporated herein by reference in its entirety. Once a fault is identified, the policy engine 210 may implement an appropriate recovery policy. For example, if a computing device fails, its IP address may be released and assigned to a new computing device. The elements on the failed computing device may be instantiated on a new computing device assigned the IP address. If an element fails, a new element of the same type may be instantiated and configured to take its place. If a pod fails, a new pod may be created and configured to take its place.

Closed loop automation 212 may also be implemented with respect to some or all of the layers. Closed loop automation 212 may include the performance of tasks, verification of performance of tasks, monitoring function, automated actions performed in response to states detected during monitoring, and other actions in order to implement some or all of the layers 200-206 and maintain operation of the layers 200-206.

Figure 3:
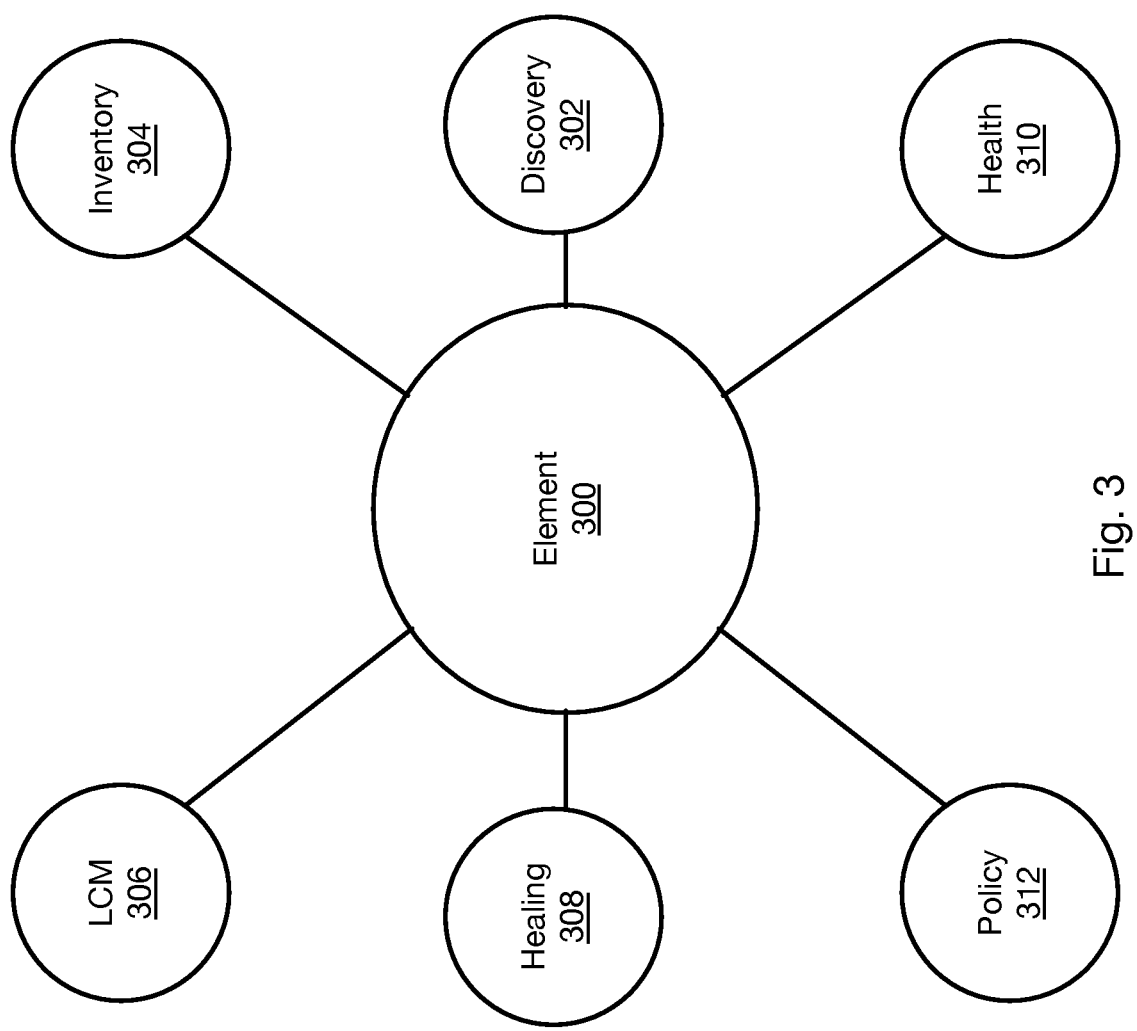
FIG. 3 is a schematic diagram of an element of a network service in accordance with an embodiment of the present invention.

FIG. 3 is a schematic diagram of an element 300 of a network service in accordance with an embodiment of the present invention. Each entity that constitutes one of the layers 200-206 may be embodied as an element 300. Each element 300 may define functions and interfaces used by the deployment automation module 116 to deploy and manage an entity represented by an element 300. An element 300 may be an entity that is a combination of sub-elements 300 and defines functions and interfaces for deploying and managing the combination of sub-elements 300. Accordingly, the deployment automation module 116 may invoke these interfaces and functions in order to deploy and manage an element without requiring any modification of the deployment automation module 116 to adapt to or have data describing the entity represented by the element 300.

For example, an element 300 may define functions and interfaces 302 for discovering the element such that once the element 300 is connected by a network to the deployment automation module 116, the element 300 may be discovered and its identity, type, and other attributes may be provided to the deployment automation module 116.

The element 300 may define functions and interfaces 304 for maintaining a reference to the element 300 in an inventory of elements 300 maintained by the deployment automation module 116. This may include responding to queries from the deployment automation module 116 with responses indicating availability of the element 300, e.g. whether it is assigned and operational.

The element 300 may define functions and interfaces 306 for performing life cycle management (LCM) of the element 300. This may include functions and interfaces for instantiating, upgrading, scaling, restarting, restarting, or de-instantiating the element 300.

The element 300 may define functions and interfaces 308 for performing healing the element 300. This may include functions and interfaces for detecting faults, recovering from faults, restoring non-functioning parts of the element 300, or other actions for restoring or maintaining function of the element 300.

The element 300 may define functions and interfaces for monitoring 310 health of the element 300. This may include functions and interfaces for running diagnostic checks, performance checks, or other evaluations of the state of operation of the element 300.

The element 300 may define functions and interfaces 312 for implementing policy with respect to the element 300. This may include functions and interfaces for receiving a policy for the element 300 and evaluating the policy with respect to a current state of operation of the element 300. The functions and interfaces 312 may define the policies themselves or may be configured to receive and implement policies received from the deployment automation module 116.

Figure 4:
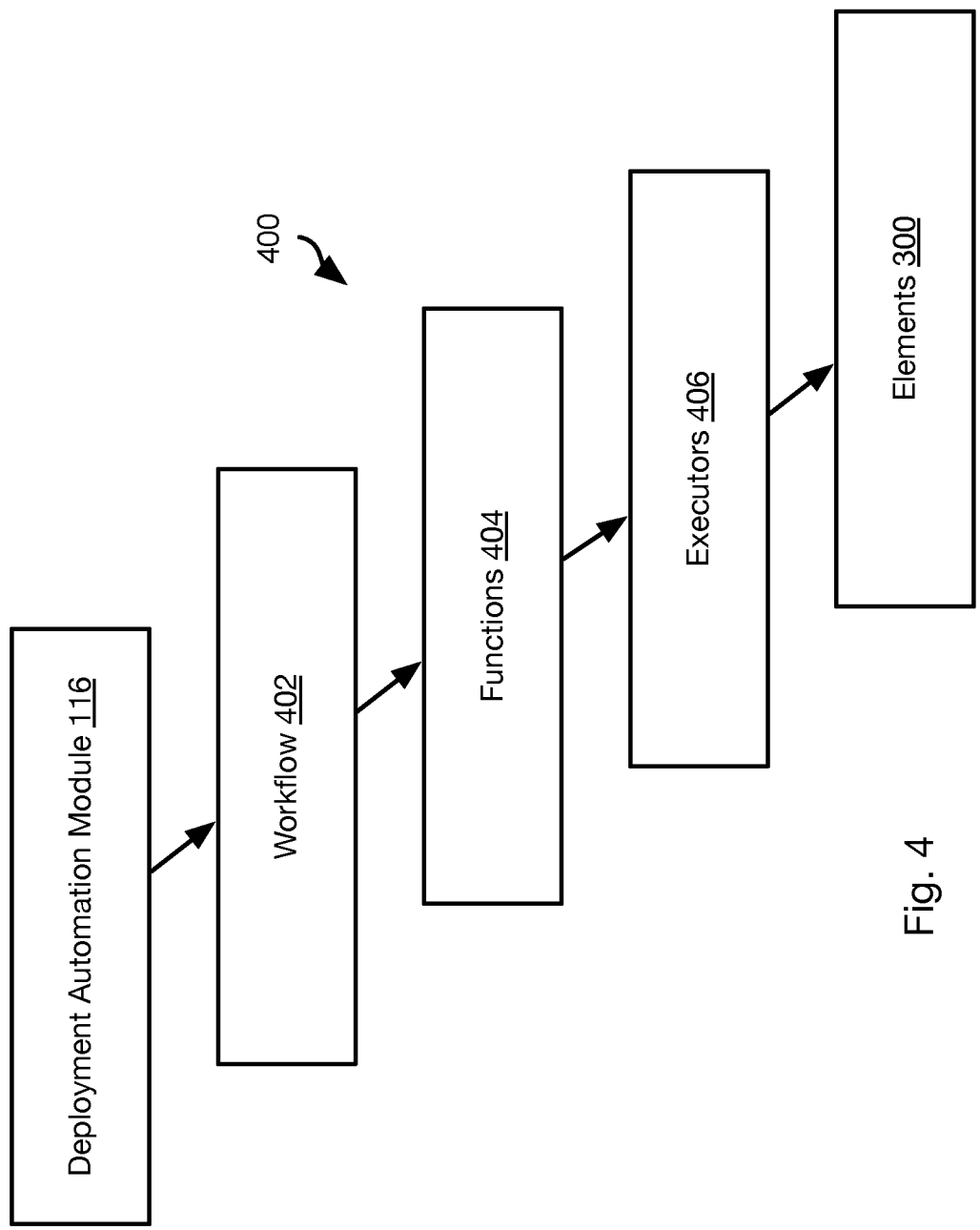
FIG. 4 is a schematic block diagram of a hierarchy for orchestrating a network service in accordance with an embodiment of the present invention.

FIG. 4 is a schematic block diagram of a hierarchy 400 for orchestrating a network service in accordance with an embodiment of the present invention. The deployment automation module 116 may ingest a workflow 402. The workflow defines a series of functions 404 and possibly an order of execution of the functions 404. The functions 404 may invoke executors 406 that operate with respect to an element 300. In particular, the functions 404 may be functions of instances of elements 300 included in the workflow 402. Accordingly, a workflow 402 may be define performance of functions 404 for specific elements 300 and possibly the ordering of these functions.

The elements 300 may be entities implementing a network service pipeline, radio area network (RAN), or any complex multi-application deployment and the workflow invokes the functions of these elements 300. As noted above, due to the abstraction of the elements 300, the workflow does not need to specify entity-specific functions. Instead tasks of a workflow 402 including discovery, inventory management, life cycle management, health monitoring, healing, policy implementation and other high-level functions may be invoked by invoking corresponding interfaces and functions 302-312 of the elements 300 of the workflow 402.

Figure 5:
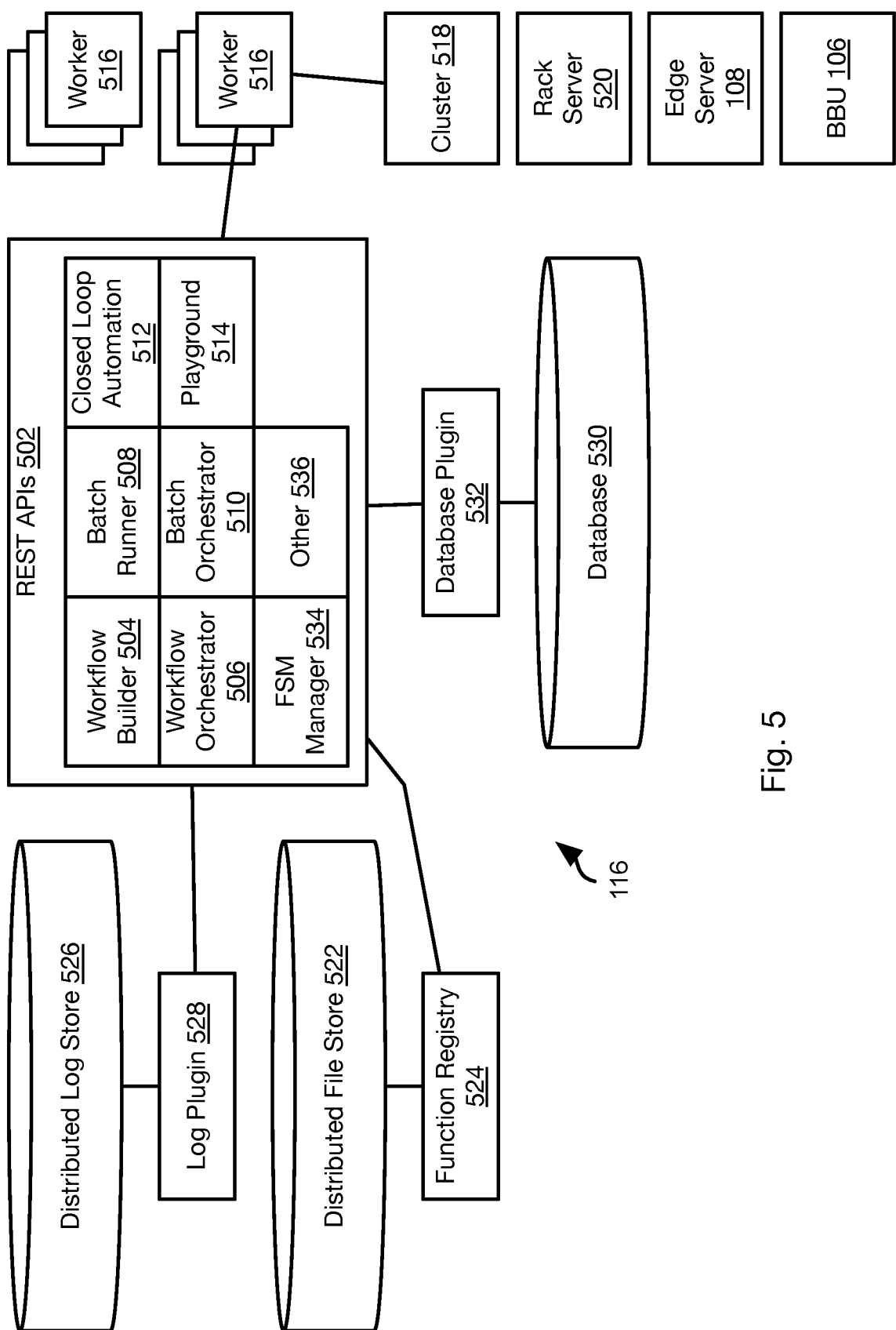
FIG. 5 is a schematic block diagram of APIs and databases for creating workflows implementing a network service in accordance with an embodiment of the present invention.

FIG. 5 is a schematic block diagram of a system for creating workflows implementing a network service in accordance with an embodiment of the present invention. In particular, the deployment automation module 116 may include or access some or all of the illustrated components.

The deployment automation module 116 may include application programming interfaces (APIs) 502, such as representational state transfer (REST) APIs, enabling a user to create and execute workflows 402. For example, a workflow builder 504 may define an interface enabling a user to create, select, and modify workflows 402 (see FIGS. 6 and 7). A workflow orchestrator 506 may implement the functions 404 of a workflow on the elements 300 of a workflow 402.

In many instances, the number of elements 300 and the functions 404 that are performed with respect to elements 300 is very large, on the order of 1000s or even millions. Accordingly, a batch runner 508 may set up batch processing of functions 404 for elements 300 and a batch orchestrator 510 may then execute the functions in batches as defined (see FIG. 9).

The APIs 502 may define closed loop automation 512 APIs that implement closed loop automation 212 of the deployment and management of the elements 300 of a workflow according to the interfaces 302-312 of the elements 300.

Figure 11:
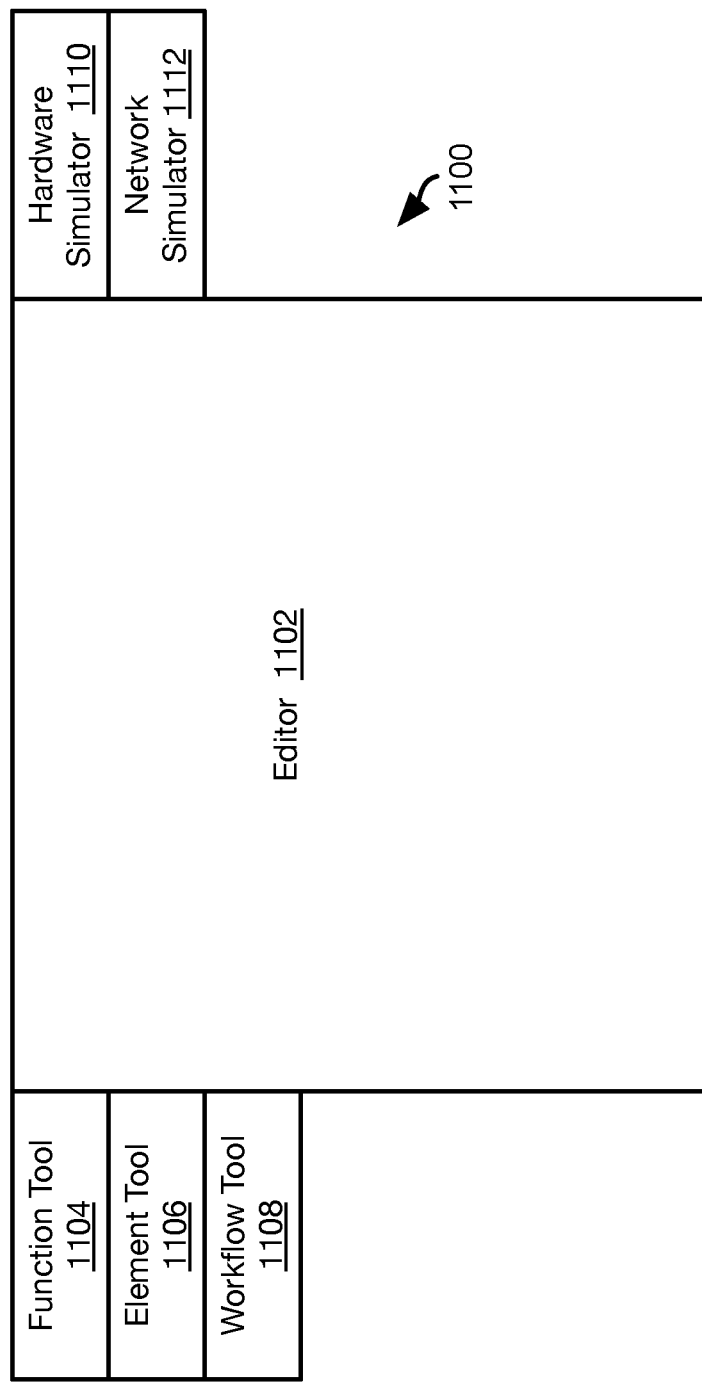
FIG. 11 is a schematic block diagram of a test platform for workflows and functions in accordance with an embodiment of the present invention.

A playground 514 may provide a testbed for the creation and evaluation of elements 300, workflows 402, and functions 404 (see FIG. 11).

Functions 404 of workflows 402, either individually or as parts of batches, may be implemented by workers 516. The workers 516 may be embodied as pods, such as pods according to the KUBERNETES orchestration platform. Alternatively, workers 516 may be processes or threads of execution executing on one or more computing devices of a network environment 100. For example, the workers 516 may execute on clusters 518, a rack server 520, edge server 108, BBU 106, or some other computing device.

The amount of files required to define the functions 404 and elements 300 of a workflow 402 may be very large. Accordingly a file store 522 may be implemented, such as in the form of a database accessed by means of a function registry 524 that maps a function 404 of an element 300 (e.g. a function identifier associated with an element identifier) to a storage location in the file store 522.

In a like manner, the number of files and amount of data generated by the functions 404 and applications instantiated by a workflow 402 may be very large. Accordingly, a distributed log store 526 may be implemented as a distributed database of log store to which functions 404 and applications instantiated by a workflow 402 may write updates too, such as by means of a log plugin 528.

Other data used by the APIs 502 may be stored in a database 530 accessed by means of a database plugin 532. For example, interfaces, templates, pre-defined workflows 402, elements 300, and other data that may be used by a user to define a workflow 404.

In some embodiments, each element 300 may have a state and a corresponding finite state machine that defines transitions between states of the finite state machine in response to events occurring involving the element 300. Accordingly, the REST APIs 502 may include a finite state machine manager 506 for managing the state machine of each instance of any of the elements 300.

Other REST APIs 536 may implement other functions, such as observability of elements (OBF), rule-based access control, cluster federation, and other functions that may facilitate implementation and management of a network service pipeline.

Figure 6:
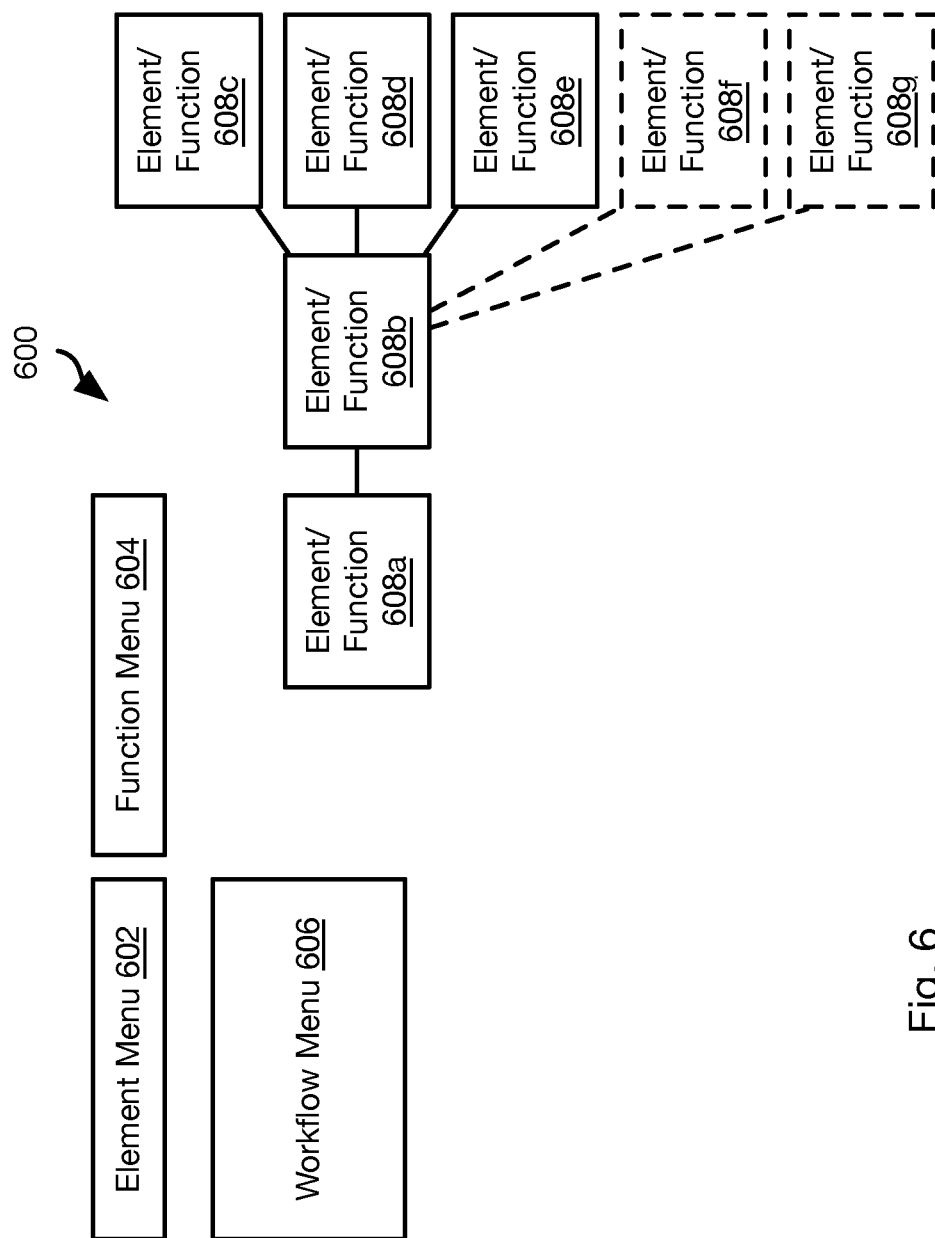
FIG. 6 is a schematic block diagram of an interface for creating workflows in accordance with an embodiment of the present invention.

FIG. 6 is a schematic block diagram of an interface 600 that may be provided by the workflow builder 504 to facilitate creating workflows 402 in accordance with an embodiment of the present invention. The interface 600 may include a menu 602 that enables a user to input a selection of an element 300 from a list of available elements 300. Elements 300 may include a virtual machine, a container, a database (e.g., MONGODB), an application, a router, a switch, a rack switch, relay, or any other element that may be needed to implement a network service. The interface may further include a function menu 604 that enables a user to input a selection of an element 300, e.g., the element selected using the menu 602. This may include any of the interfaces and functions 302-312 described above. For example, where a workflow 402 is to be created that instantiates a network pipeline, the functions selected from the menu 604 may be functions to instantiate the selected element. For example, an element/function (i.e., a selected function for a selected element type) 608*a* may define instantiating a primary manager of a cluster, element/function 608*b* may define instantiating a secondary manager of the cluster, element/functions 608*c*-608*e* may define instantiating one or more other nodes of the cluster. Other functions for a cluster may include acquiring licenses for software, performing network configuration of the managers and nodes of the cluster, acquiring IP addresses for the cluster and nodes of the cluster, setting up bundles (e.g., bundled applications), and setting up external backup depositories.

Each element/function 608*a*-608*e* input by a user may be represented by an icon on the graphical user interface (GUI) 600, such as shown in FIG. 6. Each element function 608*a*-608*e* may have configuration parameters such as internet protocol (IP) address, identifier, number of processing cores, amount of memory, amount of storage, etc., to be allocated to the node instantiated by the function 608*a*-608*e*. These parameters may be specified by default or may be input by a user, such as by accessing a menu permitting their input by clicking on a representation of a function 608*a*-608*e* in the interface 600.

A workflow 402 including any of the functions 404 for any of the elements 300 described herein may be created and configured in the same manner as for the example described above.

In some embodiments, predefined workflows 402 may be selected from a workflow menu 606. A user may then modify the workflow 402. For example, a workflow selected from the workflow menu 606 or created by a user may be modified to include additional element/functions 608*f*, 608*g*.

Figure 7:
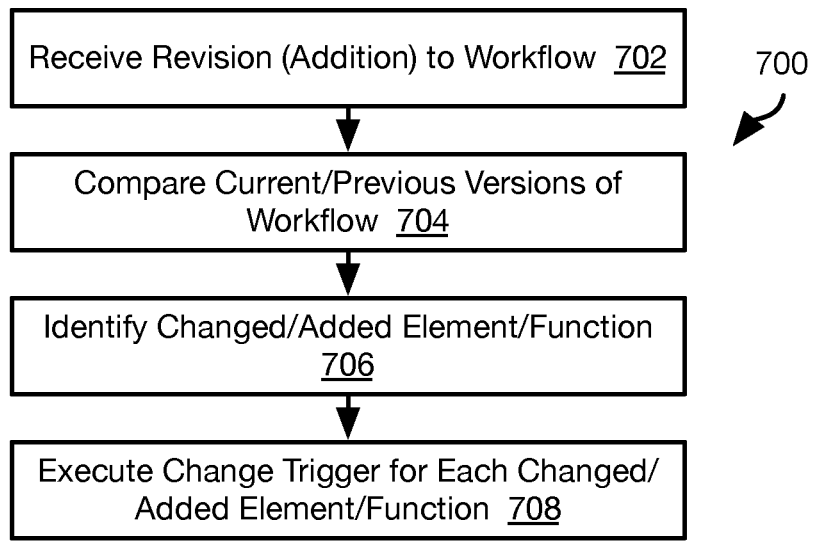
FIG. 7 is a process flow diagram of a method for dynamically modifying a workflow in accordance with an embodiment of the present invention.

Referring to FIG. 7, in some embodiments, workflows 402 may be defined dynamically such that aspects of the modification of the workflow 402 are automated. In particular, there may be many parameters that define a particular element/function 608*a*-608*e*. The method 700 may be executed by the workflow builder 504 to automatically reconfigure a workflow 402 in response to modification thereof. A workflow 402 may be implemented dynamically in terms of its structure and its functionality a described below. In particular, a workflow 402 may be modified according to a type of an element instance, and a size of an element instance. Some of the attributes, e.g., size or health, of an element instance may be determined at runtime or change during runtime such that the workflow 402 may be dynamically changed according to triggers associated with the changed attributes as described below.

The method 700 may include receiving 702 a revision to a workflow 402, such as addition of one or more other element/functions 608*f*, 608*g*. These revisions may also include modifying the parameters of one or more existing element/functions 608*a*-608*g* of a workflow 402.

The method 700 may include comparing 704 the modified workflow to the previous version of the workflow and changed or added element/functions may be identified 706 according to the comparison. For example, when the user is done making changes and saves the modified workflow or otherwise invokes step 704, this comparison may be performed.

In some embodiments each element 300 may define triggers for each function thereof. Accordingly, when an element/function is added or a parameter thereof is modified, the trigger corresponding thereto may be executed 708 by the workflow builder 504. The trigger may define functions for dynamically modifying the workflow 402 in response to the modification or addition. For example, where a modification is the addition of an element/function, the trigger may define parameters for defining the new element/function in accordance with other instances of that element function 404 already in the workflow 402. For example, for a new cluster node, these automatically populated parameters may include an identifier, IP address, and relationship to a primary or secondary node of a cluster, or other nodes of the cluster. Triggers may likewise define modifications to other parameters of an element/function or the parameters of other element/functions of a workflow 402 when one of the parameters of the element/function is changed.

In this manner, the user is relieved of the burden of configuring each element/function of a workflow 402 when it is added. This enables a small set of predefined workflows 402 to be scaled and modified according to desires of a user using simple menu interactions and drag-and-drop interactions with icons representing the element/functions of a workflow 402.

Figure 8:
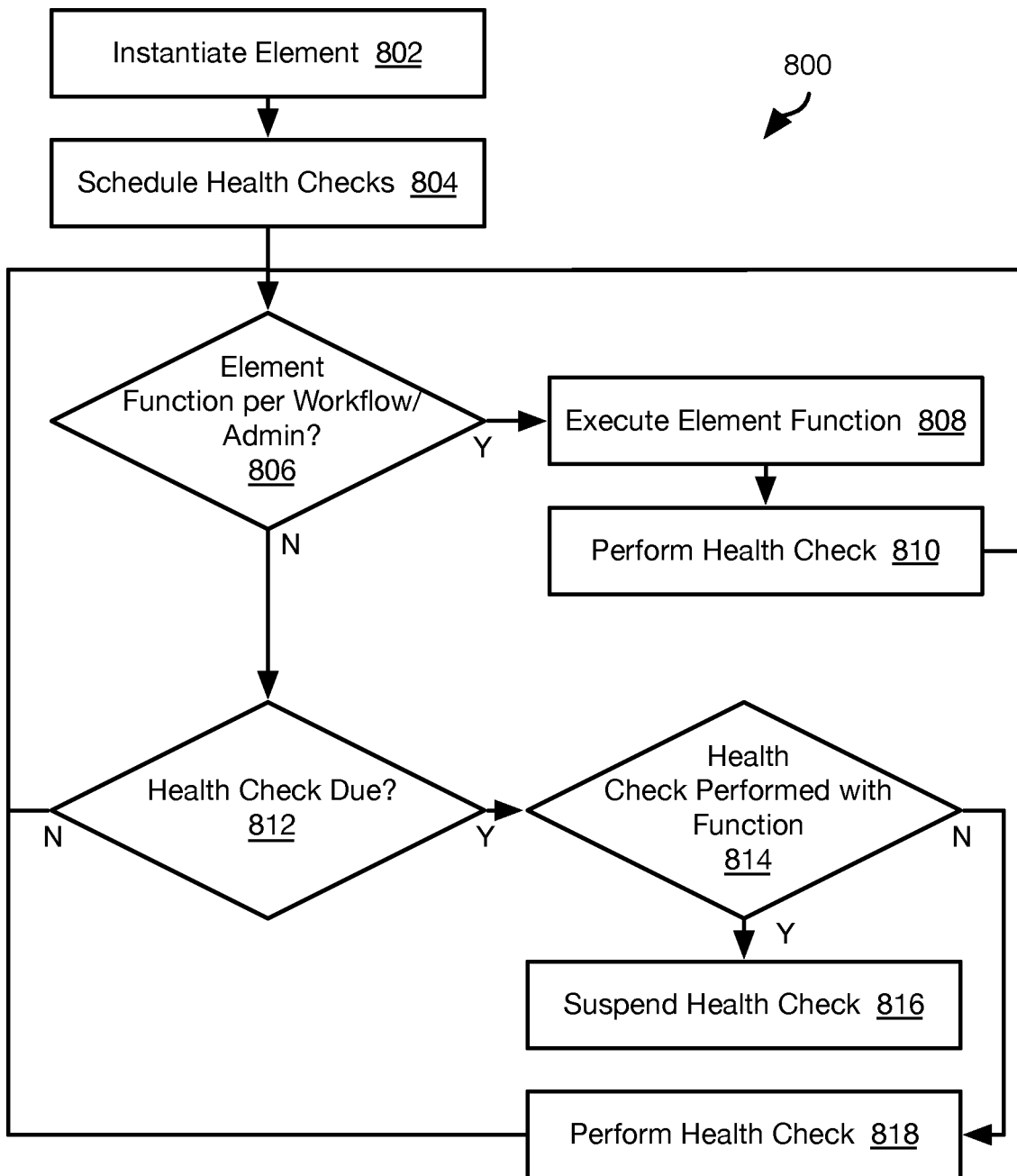
FIG. 8 is a process flow diagram of a method for performing health checks on an element in accordance with an embodiment of the present invention.

FIG. 8 is a process flow diagram of a method 800 for performing health checks on an element in accordance with an embodiment of the present invention. This may include executing the functions 310 for evaluating the health of the element 300 as described above with respect to FIG. 3. The health evaluations according to the functions 310 may be invoked by the deployment automation module 116 or by the element 300 itself following instantiation. The illustrated method 800 improves the efficiency of such health checks.

The method 800 may include instantiating 802 an element 300. The method 800 may further include scheduling 804 health checks. For example, the element 300 may itself be configured to invoke the health evaluation functions 310 at a predefined period. Alternatively, the deployment automation module 116 may schedule 804 performance of the health checks or instruct another element 300 to perform the health checks.

Following instantiation, various functions of an element 300 may be invoked, such as any of the LCM functions. In some embodiments, if a function of an element 300 is found 806 to be invoked on an instance of that element 300, that function is executed 808 and a health check is also performed 810 using the health evolution function for that instance of the element 300.

If a health check is found 812 to be due for the instance of the element 300, the method 800 may include evaluating 814 whether a health check was already performed, such as as part of executing 808 another function at step 810. For example, if a health check performed with execution 808 of another function is performed within a threshold time period of a scheduled health check, the scheduled health check is suspended 816. For example, the threshold time period may be defined as a fraction of the period between scheduled health checks, e.g. from 5 to 25 percent.

If the evaluation of step 814 is negative (no health check following function execution within the threshold time period from the scheduled time), the health check is performed 818.

Figure 9:
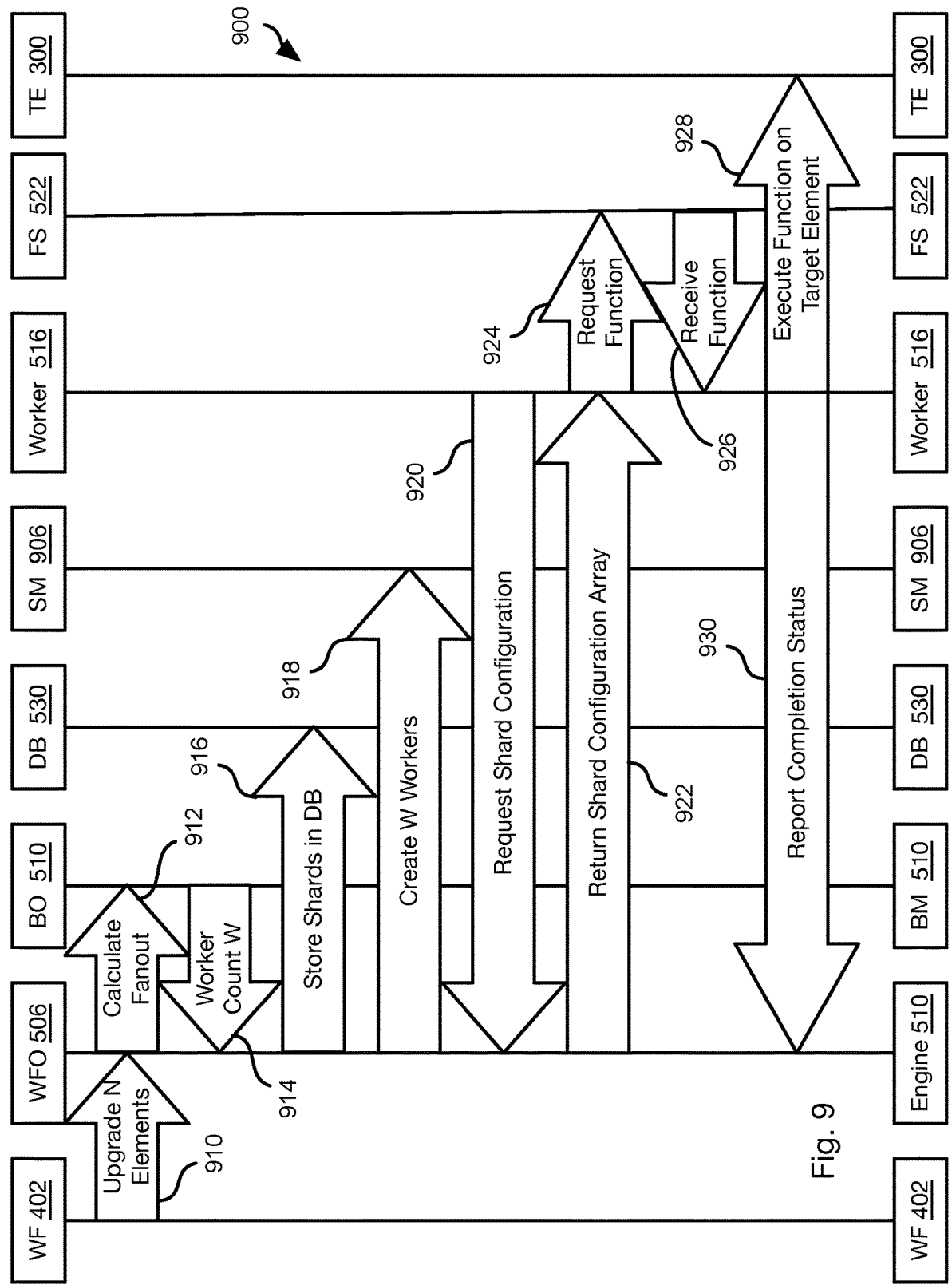
FIG. 9 is a process flow diagram of a method for batch processing functions for large numbers of elements in accordance with an embodiment of the present invention.

FIG. 9 is a process flow diagram of a method 900 for batch processing functions for large numbers of elements in accordance with an embodiment of the present invention. The method 900 may be performed by the deployment automation module (DAM) 116, such as using the workflow orchestrator (WFO) 506 batch orchestrator (BO) 510. Various other entities are involved in the method 900, including a workflow (WF) 402, the database (DB) 530, a spawning manager (SM) 906, worker 516, file store (FS) 522, and a plurality of target elements (TE) 300.

The method 900 may include receiving 910 an instruction to perform a function with respect to N elements 300. In the illustrated example, this function is upgrading, though any function ascribed herein to an element 300 may also be performed. In a typical application, N is very large, on the order of 1000s, 10,000s, or millions. The instruction 910 may be received from a user or received as part of processing a workflow 402.

The workflow orchestrator 506 receives the instruction and, in response, may calculate 912 fanout. This may include determining how many of the target elements 300 will be processed according to the function by a worker. The fanout may be static for all types of elements 300, defined for a particular type of element 300, defined for a particular function 302-312, defined for a particular function 302-312 of a particular type of element 300, or be determined based on some other criteria, which may be dynamic, such as a function of the value of N or current loading of workers 516 of the deployment automation module 116.

The batch orchestrator 510 may return 914 a worker count W that is a number of workers that are available to perform the function with respect to the N target elements 300. The work flow orchestrator 506 may then divide the N target elements 300 into shards such that each shard has approximately (e.g., +/−10) N/W elements 300 assigned to it. Each shard may include element identifiers of the target elements 300 assigned to it and may itself be assigned a shard identifier. The shards may be stored 916, such as in the database 530.

The workflow orchestrator 506 may then invoke 918 the creation of W workers. For example, a spawning module 906 may be programmed to generate workers 516 in response to receiving the instruction from step 918. Upon instantiation, the workers may each request 920 a shard from the workflow orchestrator 506, which may then return 922 a shard configuration array, e.g., an array of target element identifiers along with an identifier of the function to be performed with respect to the target elements 300 referenced by the target element identifiers.

The worker 516 may then request 924 the function, e.g. a script or executable, corresponding to the function identifier received at step 922, from the file store 522. The worker 516 then receives 926 the function and executes 928 the function on each of the target elements 300 reference in the shard configuration array received at step 922. Upon completion of execution of the function with respect to each target element 300 referenced by the shard, the worker 516 reports 930 completion to the workflow orchestrator 506. When all workers 516 complete processing of their shards, the instruction received at step 902 may be complete.

Figure 10:
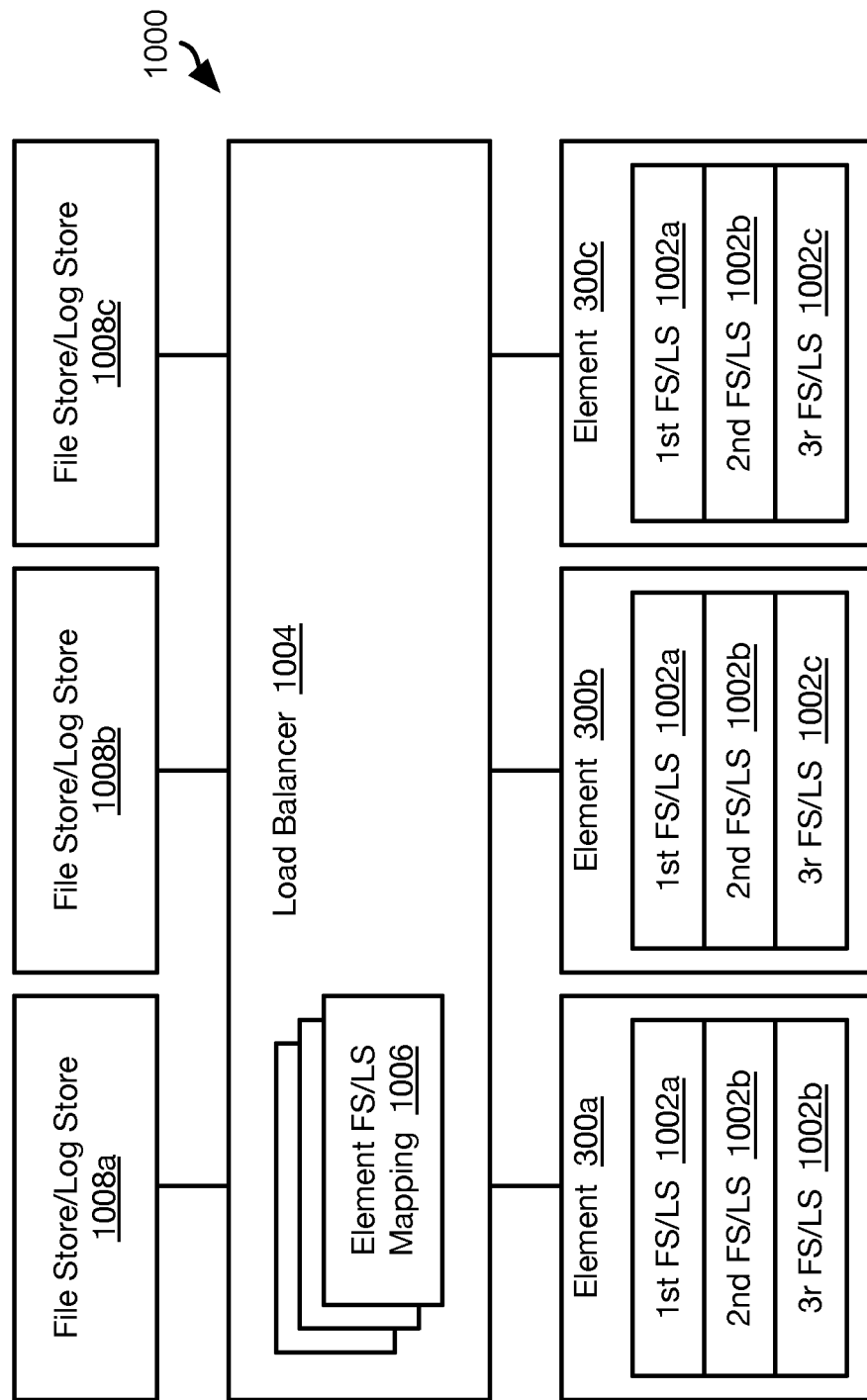
FIG. 10 is a schematic block diagram illustrating an approach for implementing file stores and log stores in accordance with an embodiment of the present invention.

FIG. 10 is a schematic block diagram illustrating an approach 1000 for implementing file stores 522 and log stores 526 in accordance with an embodiment of the present invention. In the foregoing description, the relationship of elements 300a, 300b, 300c is described with respect to reading from file stores 1008a, 1008b, 1008c. It shall be understood that writing to log stores may be distributed in a like manner.

Each element 300a, 300b, 300c may be configured with a list of file store identifiers 1002a, 1002b, 1002c indicating a primary file store, secondary file store, and a tertiary file store. Other numbers of file stores may be used with three being an example. Each element 300a, 300b, 300c will attempt to read from the file store referenced by its primary identifier 1002a, followed by attempting to read from that referenced by the secondary identifier 1002b if not successful, followed by attempting to read from that referenced by the tertiary identifier 1002c if not successful.

The file stores 1008a may be distributed. The computing devices of a network environment 100 may be distributed in different server racks, different buildings, different cities, or even different countries. Accordingly, the functions 302-312 of the elements 300 of a workflow 402 may be stored in copes distributed on various computing devices of the network environment, each copy being one of the file stores 1008a-1008c. Each element 300a-300c may therefore be configured to request files from a primary file store closest to it, with back up file stores referenced as secondary and tertiary where the primary file store is not available Requests to read from the file store 522 may be routed through a load balancer 1004. The load balancer 1004 may include mappings 1006 for each element 300a-300c, e.g. identifiers of the primary, secondary, and tertiary file stores 1002a-1002c. Accordingly, the load balancer 1004 may route request to read from the file store 522 according to a load balancing approach that prioritizes the primary file store of the requesting element 300a-300c as indicated in the mapping 1006 for the requesting element 300a-300c but may route to the secondary or tertiary file store, or possibly some other file store 1008a-1008c based on loading, e.g. if latency of the primary file store is high such that another file store 1008a-1008c may provide lower latency.

FIG. 11 is a schematic block diagram of a test platform 1100 for workflows and functions in accordance with an embodiment of the present invention. The test platform 1100 may include an editor 1102 that may be a word processor for inputting scripts or other computer code, a graphical user interface for assembly workflows (see FIG. 6), or other interface for creating functions, elements, workflows, or other executables. The test platform 1100 may include a tool 1104 for editing functions, a tool 1106 for editing elements, and a tool 1108 for editing workflows. Each tool 1104-1108 may include user interface elements enabling a user to create functions, elements, or workflows.

The platform 1100 may further include simulators. For example, a hardware simulator 1110 may simulate the function of a computing device, BBU, drone, or other hardware device. Accordingly, a function, element, or workflow that is defined for implementation for a hardware device may be simulated using the simulator 1110 for that hardware device. The test platform 1100 may further include a network simulator 1112 that simulates a network, e.g. network protocols, network latency, etc. Accordingly, a topology of elements 300 that are separate by a network may be tested by simulating execution on simulated hardware devices connected by a simulated network.

Once a function, element, or workflow created by a user has been created and tested, it may then be deployed by the deployment automation module 116 according to the systems and method described herein.

Figure 12:
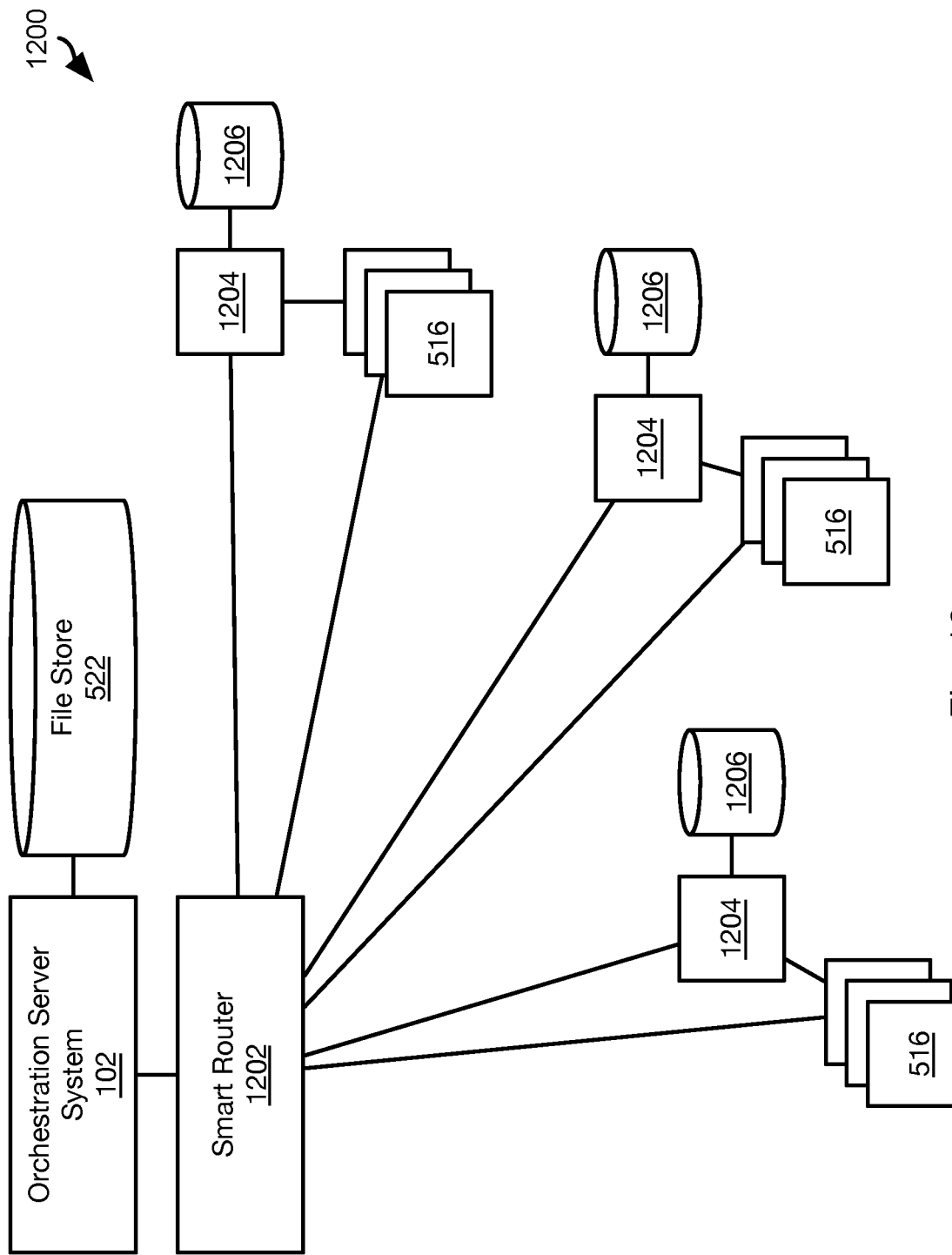
FIG. 12 is a schematic block diagram of a distributed file store in accordance with an embodiment of the present invention.

Referring to FIG. 12, in some embodiments, the distribution of files, such as executables for the functions to be executed by or with respect to elements 300 of a workflow 402, may be performed using the illustrated system 102.

A smart router 1202 may be coupled to various local distributors 1204. The local distributors 1204 may be embodied as applications executing within pods, e.g. KUBERNETES pods, executing throughout a network environment. The distributors 1204 may host or access a local database 1206. The local database 1206 may be a copy of the file store 522 or a portion thereof. For example, given the elements instances in proximity to the local distributor 1204, the portion of the file store 522 may include data from the file store 522 relating to those elements, e.g. executables and data for performing the functions of those element instances. Proximity to the local distributor 1204 may mean located in the same sub-network, or having a network connection to the local distributor 1204 having latency below a threshold.

Workers 516 may request data from the file store 522. These requests may be received by the smart routers 1202, which identifies the local distributor 1204 that is either (a) having a lowest network latency connection to the requesting worker 516 or (b) is more available (lower latency due to lower loading) to distribute files than the local distributor 1204 with lowest network latency. For example, the smart router 1202 may include a load balancer 1004 as described above with respect to FIG. 10 such that the local distributor 1204 is selected according to network latency and loading as described above.

The request is then routed by the smart router 1202 to the selected local distributor 1204, which then provides the requested data to the worker 516 that generated the request.

Figure 13:
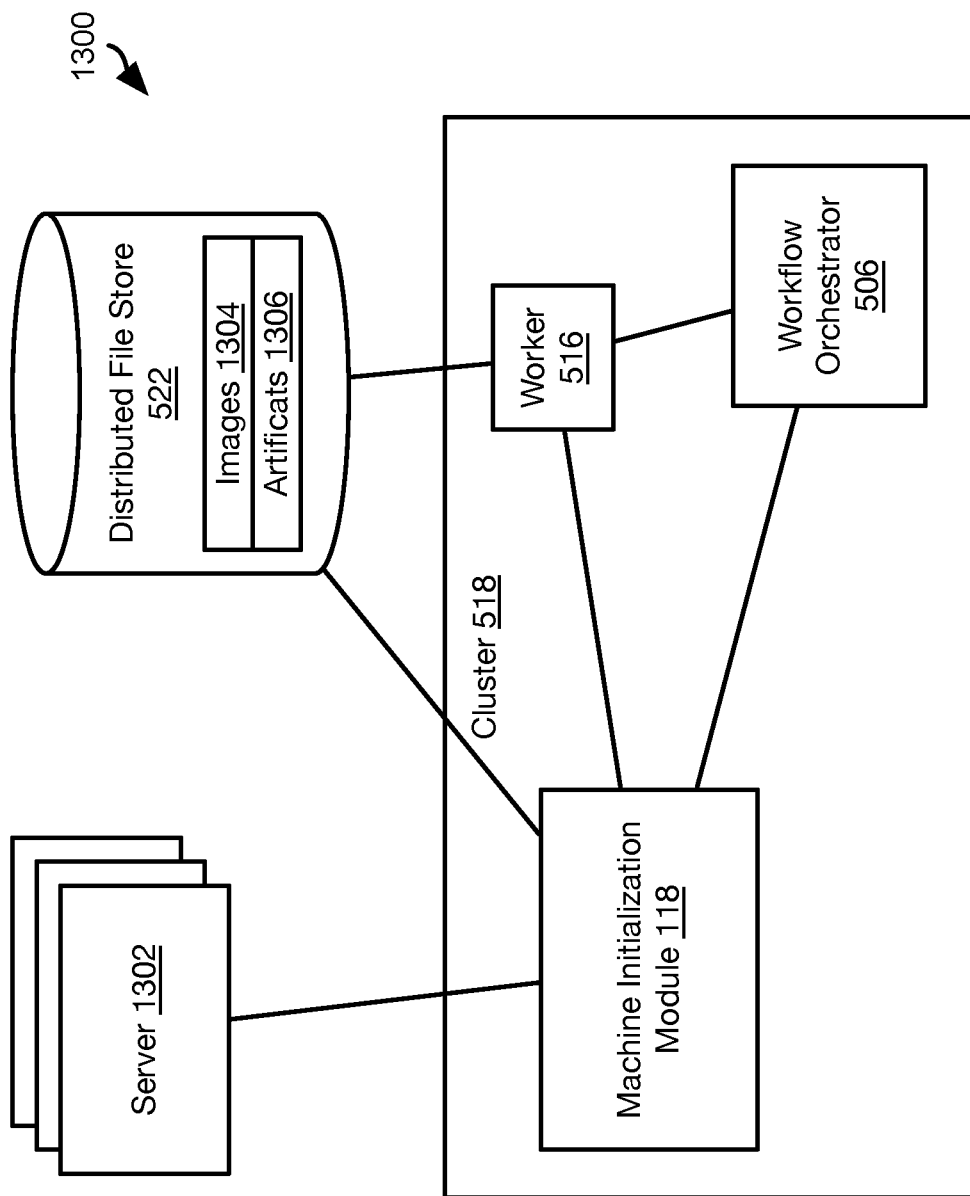
FIG. 13 is a schematic block diagram of a system for initializing servers in accordance with an embodiment of the present invention.

FIG. 13 illustrates a system 1300 that may be used to implement the functionality of the machine initialization module 118. The machine initialization module 118 may operate with respect to servers 1302 that are "bare metal," i.e. have no operating system, kernel, or other software installed thereon other than firmware stored in non-volatile RAM on the device. This firmware will include a basic input output system (BIOS) as well as firmware on components of the server 1302 such as a network adapter (e.g., network interface card (NIC)), hard disk drive (HDD), solid state drive (SSD), redundant array of independent disks (RAID), just a bunch of disks (JBOD), field programmable gate array (FPGA), baseboard management controller (BMC), Non-Volatile Memory Express (NVME) controller, or other component of the server 1302. Although the foregoing description makes reference to a server 1302, any computing device, such as a router, switch, endpoint (personal workstation, mobile computing device, internet of things (IOT) device, etc.), or any other computing device that may communicate over a network.

The machine initialization module 118 itself may be structured as an application that may execute on a node of a cluster 518. The machine initialization module 118 may operate on the same cluster 518 or a different cluster from a cluster hosting the workflow orchestrator 506 and one or more workers 516 implementing functions of a workflow being managed by the workflow orchestrator 506 according to the methods described herein.

The machine initialization module 118 may access the distributed file store 522 to obtain images 1304 of operating systems and other executables to be instantiated on a server 1302. The distributed file store 522 may also store artifacts 1306 that are likewise executables or other data that are used by the machine initialization module 118 to initialize a bare metal server 1302.

Figure 14:
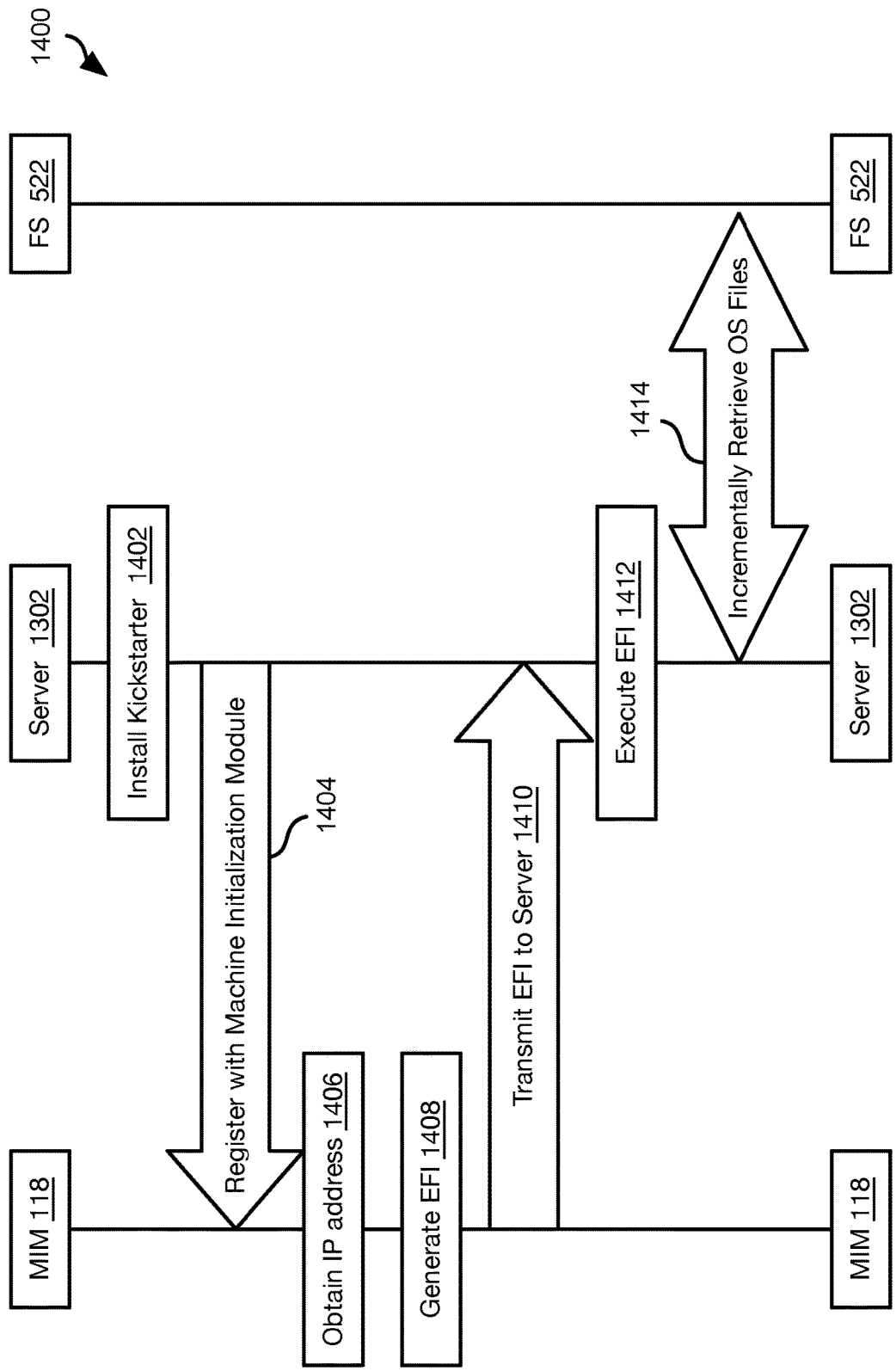
FIG. 14 is a process flow diagram of a method for initializing a server in accordance with an embodiment of the present invention.

FIG. 14 illustrates a method 1400 for initializing a server 1302. The method 1400 may begin with installing 1402 of a kickstarter executable on the server 1302. The kickstarter may correspond to the configuration of the server 1302. The configuration of the server 1302 may be represented using a JAVASCRIPT Object Notation (JSON) file that describes the hardware, firmware, and/or software versions of the server 1302. The JSON file may further include links to a kickstarter file that corresponds to the needs of an application to be installed on the server 1302, that corresponds to the SKU of the server system 1302, or is configured based on some other criteria. For example, there may be a kickstarter associated with each SKU (stock keeping unit) defining a type of server 1302. Accordingly, the kickstarter installed at step 1402 may be that which corresponds to the SKU of the server 1302. The kickstarter may include a profile of the server 1302, such as according to the Basic, EPA-1, EPA1-test, and/or EPA2 system profile types.

The kickstarter may include a configuration file that configures the server 1302 to register with the machine initialization module 118. Since the server 1302 is not configured with an operating system or an IP (internet protocol) address, the kickstarter may include computer instructions that instruct the server 1302 to communicate with the machine initialization module (MIM) 118 using the baseboard management controller (BMC) IP address with which the server 1302 was configured by a manufacturer. The kickstarter may include an IP address for the machine initialization module 118 or that of some other component that is programmed to route communications from a kickstarter to the machine initialization module 118. Alternatively, the request to register may be broadcast and detected by a component in a network environment that routes the request to the machine initialization module 118. Installing 1402 of the kickstarter may be performed manually by a human operator or by a component coupled to a network to which the server 1302 is connected when installed in a rack, datacenter, or other facility.

The server 1302 executes the kickstarter, which causes the server 1302 to register 1404 with the machine initialization module 118 by communicating over the network to the IP address included in the kickstarter. Registering may include providing the BMC IP address of the server 1302 to which the machine initialization module 118 may address subsequent communications.

The machine initialization module 118 may obtain 1406 an IP address ("the server IP address") to assign to the server 1302 and generate 1408 an extensible firmware interface (EFI) image including the IP address. The IP address may be assigned at step 1406 according to a workflow 402. For example, if the server 1302 is (or hosts) an element instance created according to a function 404 workflow 402, the parameters of the function 404 may include a statically or dynamically assigned IP address for the server 1302. Alternatively, the IP address may be assigned according to an IP address management (IPAM) algorithm executed by the machine initialization module 118, workflow orchestrator 506, or other component in a network environment. In particular, the method 1400 may be executed independently from the workflow orchestration approaches described herein such that the IP address is obtained according to an IPAM algorithm according to any approach known in the art.

The machine initialization module 118 may generate 1408 an executable file including the IP address. In some embodiments, the executable file may be an extensible firmware interface (EFI) image. The executable file may be generated according to the workflow used to select the IP address. The executable file may further include network information such as an IP address for a network gateway to be used by the server 1302, e.g. a node in a network domain including the IP address assigned to the server 1302. The executable file may further contain instructions for configuring the server 1302 to connect to a virtual local area network (VLAN).

In some embodiments, the EFI image may include executable code instructing the server 1302 to retrieve and install an operating system kernel from a specified IP address. The EFI image itself may be configured as a bootstrap kernel from which the server system 1302 may boot itself up. The EFI image may include executable code instructing the server 1302 to retrieve and execute firmware upgrade files for the BIOS, network adapter, HDD, SSD, BMC, BIOS, NIC, RAID, JBOD, NVME controller, FPGA, or other component of the server 1302. Upgrading of firmware or other operations instructed by the EFI image may further include flashing custom images on any of these components or otherwise configuring these components, such as a RAID or JBOD. The EFI image may include executable code instructing the server 1302 to retrieve operating system files for installing an operating system on the server 1302. The EFI image may be formatted as an ISO (International Organization for Standardization) image that can be mounted as a disk to be booted up from on the server 1302. The EFI image is preferably small, such as less than 3 MB. For example, an ISO file size of 2.12 MB has been found to be achievable.

In some embodiments, the EFI image may be obtained from a boot configuration file including the above-described instructions to configure the server IP address, network gateway, and retrieve and install the operating system kernel. The boot configuration file may further include instructions to connect to a virtual local area network (VLAN). The boot configuration file may be written in IPXE (an open source implementation of the Preboot Execution Environment client firmware and bootloader) scripting language and using IPXE syntax. This IPXE scripting language may be compiled using IPXE source code to obtain a bootable EFI image that packs the information of the boot configuration file in a form that can be executed by an IPXE bootloader on the server 1302 in either legacy BIOS or EFI mode.

The IPXE bootloader is typically a small kernel that includes drivers for the hardware of the server 1302 and has the ability to configure new hardware of different types including networking, storage, and the like. In the illustrated embodiment, the ability of the IPXE bootloader to configure a network interface is used to configure the server IP address and network gateway of the server 1302 and may also be used to configure the server 1302 to connect to a VLAN.

The EFI image may be converted into a bootable ISO file. The BMC of the server 1302 may be capable of mounting an ISO file either through an API (application programming interface) call or manual intervention. In some embodiments, a boot order on the server 1302 may be modified such that the server 1302 boots from the bootable ISO file including the EFI image. For example, the kickstarter may be programmed to modify the boot order in this manner.

The bootable ISO file may include both the EFI image and a bootloader, such as the "isolinux.bin" bootloader. The bootloader may contain the encoded form of the configuration file that will be executed on the serer 1302 during the boot load process where the bootloader successively attempts to configure each interface according to the EFI image (including the network interface as described above) and tries to retrieve the operating system kernel according to instructions in the EFI image. Once the bootloader successfully retrieves the operating system kernel, it uses this interface to install the rest of the OS, as described below with respect to FIG. 15.

The bootloader, such as isolinux.bin, may be added to the ISO file including the EFI image to perform bootloading of the hardware of the server 1302. The EFI image (e.g., an ipexe.efi file) interacts with the EFI BIOS to do an initial boot, recognize EFI capabilities, and present the EFI capabilities to the kernel for a Stage 2 booting of the kernel in EFI mode. This EFI image may be placed in the file store 522 where it is accessible via an HTTP (hypertext transport protocol) server (or an HTTP secure (HTTPS) server).

The machine initialization module 118 transmits 1410 the EFI image (e.g., ISO file including the EFI image) to the server 1302. The server 1302 receives the EFI image and executes 1412 it. This may include mounting the ISO image and executing the bootloader in the ISO image. The bootloader processes the EFI image to configure the network interface of the server 1302 and retrieve and install an operating system kernel as described above. In some embodiments, the EFI image may be executed by a VMCLI (virtual machine command line interface) utility on the server 1302.

As a result of executing the EFI, the server 1302 is configured with an IP address for itself, an IP address of a network gateway to be used by the server 1302, an operating system kernel, and with instructions to download an operating system from a specified source IP address, such as that of the file store 522. In some embodiments, the EFI image includes instructions causing the bootloader to incrementally retrieve 1414 the operating system. For example, instead of having to retrieve a 2 GB ISO file including an operating system image, the EFI image may include instructions to download smaller installation packages implementing installation of the operating system in order to reduce loading of the file store 522.

Figure 15:
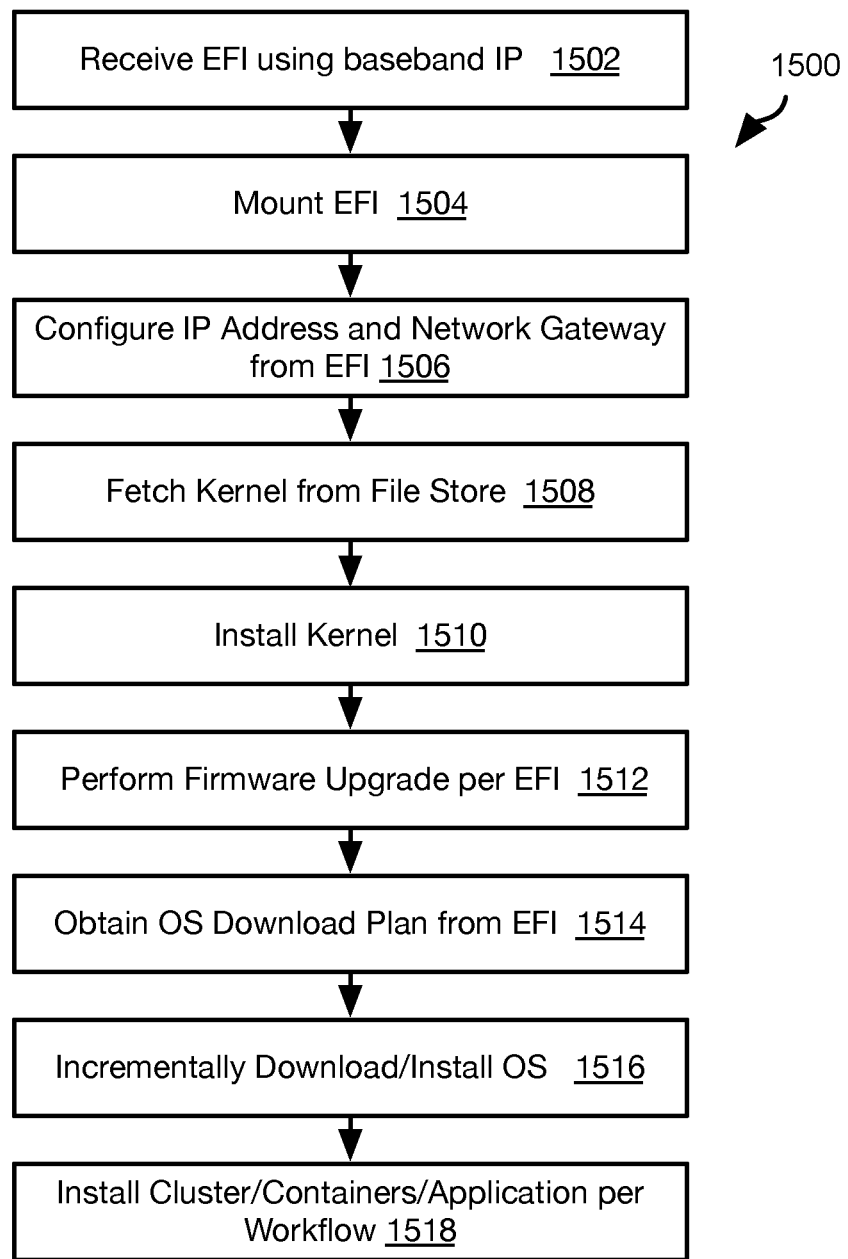
FIG. 15 is a process flow diagram of a method including actions performed on a server during initialization in accordance with an embodiment of the present invention.

FIG. 15 illustrates a method 1500 that may be executed by the server system 1302. The server system 1302 receives 1502 the ISO file including the EFI image, such as using the BMC IP address of the server system 1302 over a network to which the server system 1302 has been connected by an operator. The server system 1302 mounts 1504 the ISO image including the EFI, such as as a RAM disk. Many vendors, such as DELL, QUANTA, and SUPERMICRO provide an interface for mounting of a bootable ISO file, including ISO files received over a network assuming that firewall considerations for opening a port (e.g., 443) are already taken care of. Mounting of the ISO file may be performed manually or automatically. In the manual approach, a user may access an option to mount an ISO file in a BMC GUI, which, when selected, transports the contents of the ISO file into the buffers of the BMC. In the automated approach, the ISO file is transferred directly to the BMC according to an interface provided by the vendor without the need to access a BMC.

The server system 1302 executes the bootloader included in the ISO image, such as an IPXE bootloader. The bootloader processes the instructions in the EFI, which causes the server system 1302 to configure 1506 itself to communicate using the server IP address specified for the server system 1302 in the EFI image and to connect to the network gateway specified in the EFI image. In particular, the EFI image may include instructions to configure a network interface of the server system 1302 to communicate with the server IP address and to connect to the network gateway.

As is apparent, this approach enables the server system 1302 to be configured to communicate with an IP address without the need for a dynamic host configuration protocol (DHCP) server. This eliminates the need to have dedicated DHCP servers for each sub-network of a network environment. For example, in many telecommunication applications, servers are grouped into racks with top of rack (TOR) switches at the north and south of the rack, which form a L2 (level 2) network. Connectivity from edge data center servers to regional data center servers flow through the TOR switches at the north and to the radio heads as the south. Provisioning of the servers of a rack according to DHCP requires a dedicated DHCP server on each rack (e.g., one of three to five servers) to lease IP addresses and facilitate OS installation. In a large data center with 10,000 racks, this means there must be 10,000 DHCP servers. Each DHCP server must itself be provisioned with a dedicated operating system image (e.g., a LINUX ISO file) that is quite large (~2 GB), which requires a large amount of storage space. The above described approach using the EFI image therefore eliminates the need for dedicated DHCP servers on each rack and for provisioning DHCP server operating system images for each rack.

Executing the EFI image by the bootloader further causes the server system 1302 to fetch 1508 an operating system kernel from the file store 522, which may include the use of the smart routing approach of FIG. 12. The operating system kernel may be in compressed files and may be fetched in a single download or multiple downloads. The operating system kernel, and possibly other configuration files, may be retrieved using HTTP, HTTPS, FTP (file transfer protocol), TFTP (trivial file transfer protocol). Fetching the operating system kernel at step 1508 may include pulling the kernel, images, packages, or other components. Retrieval of the operating system kernel and other files by means of HTTP may be performed due to the configuration of the network interface of the server 1302 to communicate using the server IP address and network gateway according to instructions in the EFI image.

Step 1508 may also include obtaining a client certificate, client key, CA (certificate authority) certificate or other data structures for performing authenticated communication from a network. These data structures may be retrieved from the artifacts 1306.

Executing of the EFI image included in the ISO file may require that the boot order of the system 1302 be changed. This may be the case where the target host is getting booted in the legacy BIOS. In some systems, booting the ISO file as a CD (compact disc) device causes the kernel to boot into legacy BIOS. For EFI booting, booting from a CD may be problematic, since a CD device is inherently not EFI capable in some systems. This causes the kernel not to detect the EFI BIOS and the kernel boots in legacy BIOS mode. To overcome this, the ISO may be mounted as a USB (universal serial bus) device that is capable of booting the hardware of the server 1302 in EFI mode. The boot order may therefore be changed such that the USB device boots earlier than the CD or the HDD.

The EFI image or the fetched files may include executable code enabling the server system 1302 to decompress and install 1510 the kernel from the fetched files. For example, step 1510 may include installing VMLINUZ or other kernel. Step 1510 may also include setting up a RAM disk on the server system 1302, such as using the "initrd" executable.

The method 1500 may further include performing 1512 firmware upgrades, such as upgrades to the firmware of any of the components described herein and performing other configurations or initializations of the components described herein. For example, the EFI image may include executable code instructing the server system 1302 to perform the upgrades. Alternatively, the EFI image may include executable code instructing the server system 1302 to download firmware upgrades from the file store 522. In yet another alternative, the files fetched for installing the operating system kernel may include firmware upgrade files that may be executed by the server system 1302 to upgrade the firmware of one or more components. In some embodiments, step 1512 may be performed prior to step 1510.

The method 1500 may include the server system 1302 obtaining 1514 an operating system download plan from the EFI. For example, once the operating system kernel is installed, the remainder of the operating system (Stage 2) may be downloaded using the same network interface used to install the operating system kernel. The download plan may include an ordered listing of files, such as installation packages, that when executed in sequence will result in installation of the operating system. The server system 1302 then downloads 1516 the files incrementally, e.g., sequentially and/or one at a time, until all are downloaded and executed, resulting in an installed and executing operating system on the server system 1302. Downloading of the operating system at step 1514 may include using the smart routing approach of FIG. 12.

Downloading and installing the operating system may further include performing tasks such as redundant array of independent disks (RAID) configuration, partitioning one or more non-volatile storage devices of the server system 1302, setting up a software repository ("repo"), performing service configurations, performing network configurations, and performing a final reboot of the server 1302.

As used with respect to step 1516, operating system, as opposed to an operating system kernel, shall be understood to include operating system components in addition to the kernel and possibly a different kernel. The operating system components in addition to the kernel may include a graphical user interface, libraries for use by applications executing on the server system 1302, user account management, and other high-level functions. In contrast, the operating system kernel may implement such functions as memory management, device drivers, a file system, and other low-level functions of the operating system.

The method 1500 may include one or more other steps 1518, such as resulting from executing functions 404 of a workflow 402. For example, a workflow 402 may include executing functions to configure the server system 1302 as part of a cluster (primary or secondary node), instantiate one or more containers and/or a virtual machine on the server 1302, instantiate an application on the server 1302, or other actions performed with respect to any of these items that may be instantiated.

Figure 16:
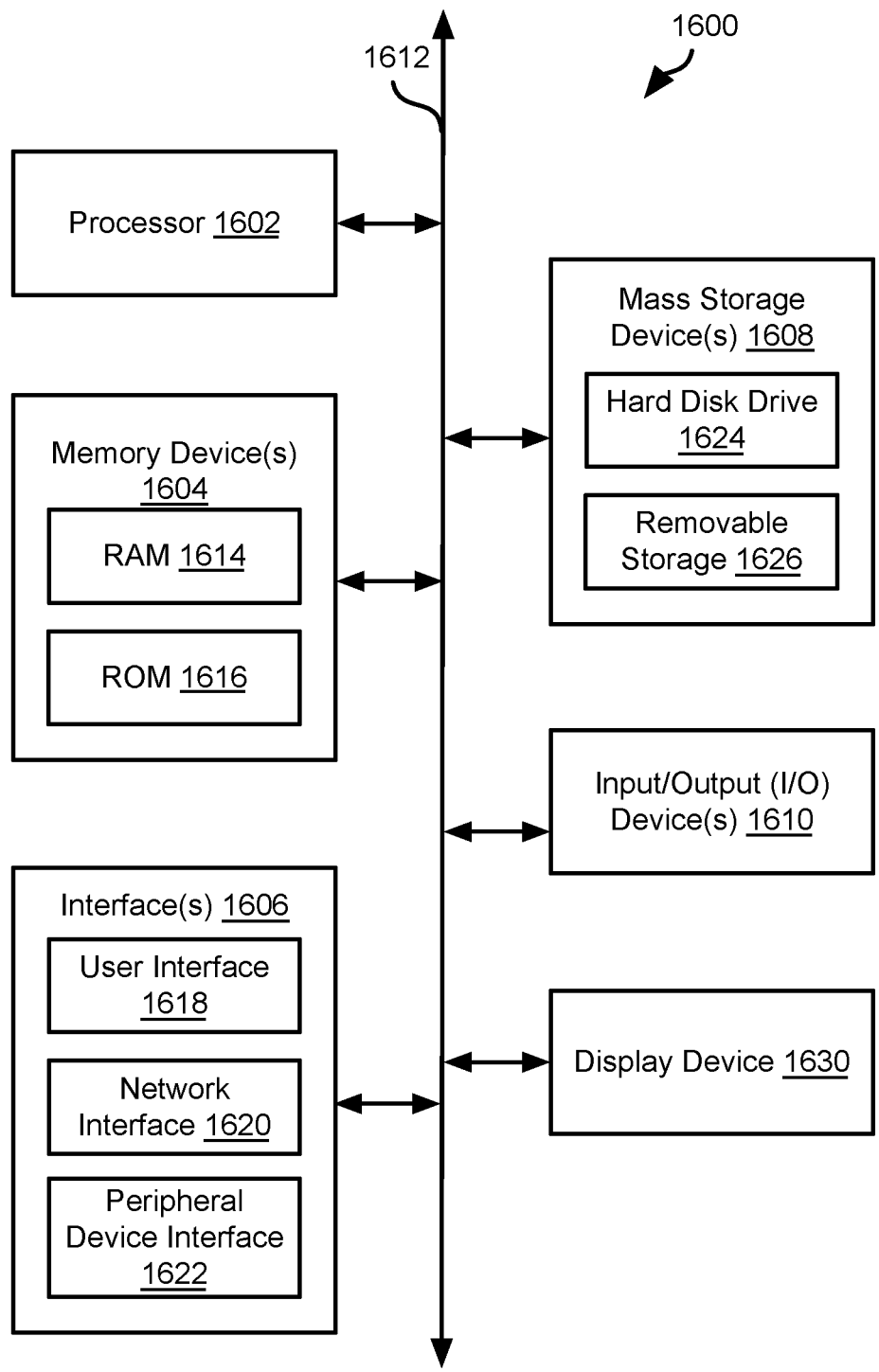
FIG. 16 is a schematic block diagram of an example computing device suitable for implementing methods in accordance with embodiments of the invention.

FIG. 16 is a block diagram illustrating an example computing device 1600. Computing device 1600 may be used to perform various procedures, such as those discussed herein. Computing device 1600 includes one or more processor(s) 1602, one or more memory device(s) 1604, one or more interface(s) 1606, one or more mass storage device(s) 1608, one or more Input/output (I/O) device(s) 1610, and a display device 1630 all of which are coupled to a bus 1612. Processor(s) 1602 include one or more processors or controllers that execute instructions stored in memory device(s) 1604 and/or mass storage device(s) 1608. Processor(s) 1602 may also include various types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, lenses, CCDs or other image capture devices, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s) 1606 include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more peripheral interfaces such as interfaces for printers, pointing devices (mice, track pad, etc.), keyboards, and the like.

Bus 1612 allows processor(s) 1602, memory device(s) 1604, interface(s) 1606, mass storage device(s) 1608, I/O device(s) 1610, and display device 1630 to communicate with one another, as well as other devices or components coupled to bus 1612. Bus 1612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1600, and are executed by processor(s) 1602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
providing a server system in a bare metal state;
requesting, by the server system while in the bare metal state, an initialization file from a file store without using dynamic host configuration protocol (DHCP) or a DHCP server;
receiving, by the server system while in the bare metal state, the initialization file, the initialization file including a server IP address assigned to the server system; and
configuring, by the server system, the server system to communicate using the server IP address.

2. The method of claim 1, wherein the initialization file further references a network gateway, the method further comprising configuring, by the server system, the server system to communicate using the network gateway according to instructions in the initialization file.

3. The method of claim 1, further comprising:
installing, on the server system, a kickstarter executable; and
executing, by the server system, the kickstarter executable to register the server system with a machine initialization module connected to the server system by a network;
wherein receiving the initialization file comprises receiving the initialization file from the machine initialization module over the network in response to registering the server system with the machine initialization module.

4. The method of claim 1, further comprising:
downloading, by the server system, an operating system kernel according to instructions in the initialization file.

5. The method of claim 1, further comprising:
downloading, by the server system, one or more firmware upgrade files according to instructions in the initialization file; and
upgrading, by the server system, firmware of one or more components of the server system according to the one or more firmware upgrade files.

6. The method of claim 5, further comprising upgrading the firmware of the one or more components of the server system prior to installing an operating system on the server system.

7. The method of claim 6, further comprising:
downloading, by the server system, an operating system package according to instructions in the initialization file; and
installing, by the server system, the operating system on the server system according to the operating system package.

8. The method of claim 6, further comprising:
sequentially downloading, by the server system, a plurality of operating system packages according to instructions in the initialization file; and
installing, by the server system, the operating system on the server system according to the plurality of operating system packages.

9. The method of claim 1, wherein the initialization file has a size of less than 3 MB.

10. The method of claim 1, wherein the initialization file is an ISO image.

11. A non-transitory computer-readable medium storing executable code that, when executed by a processing device, causes the processing device to:
receive a request for an initialization file from a server system in a bare metal state, the request not being a dynamic host configuration protocol (DHCP) request;
generate the initialization file, the initialization file including a server IP address assigned to the server system and including instructions to configure the server system to communicate using the server IP address; and
transmit the initialization file to the server system while the server system is in the bare metal state without using DHCP or a DHCP server.

12. The non-transitory computer-readable medium of claim 11, wherein the initialization file further references a network gateway and includes instructions to configure the server system to communicate using the network gateway.

13. The non-transitory computer-readable medium of claim 11, wherein the executable code, when executed by the processing device, further causes the processing device to:
receive a request from a kickstarter executable executing on the server system to register the server system; and
generate the initialization file in response to the request.

14. The non-transitory computer-readable medium of claim 11, wherein the initialization file further includes instructions to cause the server system to download an operating system kernel.

15. The non-transitory computer-readable medium of claim 11, wherein the initialization file further includes instructions to cause the server system to:
download one or more firmware upgrade files; and
upgrade firmware of one or more components of the server system according to the one or more firmware upgrade files.

16. The non-transitory computer-readable medium of claim 15, wherein the initialization file further includes instructions to cause the server system to upgrade the firmware of the one or more components of the server system prior to installing an operating system on the server system.

17. The non-transitory computer-readable medium of claim 16, wherein the initialization file further includes instructions to cause the server system to:
download an operating system package; and
installing, by the server system, the operating system on the server system according to the operating system package.

18. The non-transitory computer-readable medium of claim 16, wherein the initialization file further includes instructions to cause the server system to:
sequentially download a plurality of operating system packages; and
install the operating system on the server system according to the plurality of operating system packages.

19. The non-transitory computer-readable medium of claim 11, wherein the initialization file has a size of less than 3 MB.

20. The non-transitory computer-readable medium of claim 11, wherein the initialization file is an ISO image.

21. The method of claim 1, wherein requesting, by the server system while in the bare metal state, the initialization file from the file store without using dynamic host configuration protocol (DHCP) or the DHCP server comprises
requesting, by the server system, the initialization file over a network.

22. The method of claim 1, wherein requesting, by the server system while in the bare metal state, the initialization file from the file store without using dynamic host configuration protocol (DHCP) or the DHCP server comprises
requesting, by the server system, the initialization file over a network.

23. The method of claim 1, wherein requesting, by the server system while in the bare metal state, the initialization file from the file store without using dynamic host configuration protocol (DHCP) or the DHCP server comprises
requesting, by the server system, the initialization file over a network using a baseboard management controller (BMC) of the server system.

* * * * *